(12) United States Patent
Otaki et al.

(10) Patent No.: US 9,296,881 B2
(45) Date of Patent: Mar. 29, 2016

(54) POLYETHYLENE-BASED STRUCTURE

(75) Inventors: Ryoji Otaki, Kanagawa (JP); Kenji Kouno, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 294 days.

(21) Appl. No.: 14/003,624

(22) PCT Filed: Mar. 7, 2012

(86) PCT No.: PCT/JP2012/055839
§ 371 (c)(1),
(2), (4) Date: Sep. 6, 2013

(87) PCT Pub. No.: WO2012/121295
PCT Pub. Date: Sep. 13, 2012

(65) Prior Publication Data
US 2013/0344270 A1    Dec. 26, 2013

(30) Foreign Application Priority Data

Mar. 8, 2011  (JP) ................................. 2011-050827
Mar. 8, 2011  (JP) ................................. 2011-050829

(51) Int. Cl.
*B32B 1/02*    (2006.01)
*B32B 1/08*    (2006.01)
*C08L 23/06*   (2006.01)
*C08L 23/04*   (2006.01)
*C08L 23/08*   (2006.01)
*C08L 23/26*   (2006.01)
*C08L 77/06*   (2006.01)

(52) U.S. Cl.
CPC . *C08L 23/06* (2013.01); *B32B 1/02* (2013.01); *B32B 1/08* (2013.01); *C08L 23/04* (2013.01); *C08L 23/0869* (2013.01); *C08L 23/26* (2013.01); *C08L 77/06* (2013.01); *C08L 23/0846* (2013.01); *C08L 2205/02* (2013.01); *C08L 2205/025* (2013.01); *Y10T 428/139* (2015.01); *Y10T 428/1352* (2015.01); *Y10T 428/1393* (2015.01); *Y10T 428/1397* (2015.01)

(58) Field of Classification Search
CPC ..... C08L 23/06; C08L 23/0869; C08L 77/06; Y10T 428/1352; Y10T 428/139; Y10T 428/1393; B32B 1/02; B32B 1/08
See application file for complete search history.

(56) References Cited

U.S. PATENT DOCUMENTS

| 5,641,825 A | 6/1997 | Bacskai et al. |
| 2006/0270799 A1 | 11/2006 | Sato et al. |
| 2010/0304164 A1 | 12/2010 | Sato et al. |

FOREIGN PATENT DOCUMENTS

| JP | 55-121017 | 9/1980 |
| JP | 58-209562 | 12/1983 |

(Continued)

OTHER PUBLICATIONS

International Search Report issued May 22, 2012 in Application No. PCT/JP2012/055839.

*Primary Examiner* — Walter B Aughenbaugh
(74) *Attorney, Agent, or Firm* — Oblon, McClelland, Maier & Neustadt, L.L.P.

(57) ABSTRACT

The present invention provides a polyethylene-based structure including from 60 to 90% by mass of a polyethylene (A), from 5 to 35% by mass of an acid-modified polyethylene (B) and from 5 to 35% by mass of a m-xylylene group-containing polyamide (C), in which the m-xylylene group-containing polyamide (C) is dispersed in a layer form in the polyethylene (A) to partially form a continuous phase thereof, and has a relative viscosity of from 2.5 to 4.5.

18 Claims, 4 Drawing Sheets

(56) References Cited

FOREIGN PATENT DOCUMENTS

| | | |
|---|---|---|
| JP | 60-6735 | 1/1985 |
| JP | 5-194799 | 8/1993 |
| JP | 5-209097 | 8/1993 |
| JP | 6-328634 | 11/1994 |
| JP | 7-52333 | 2/1995 |
| JP | 2005-206806 | 8/2005 |
| JP | 2007-177208 | 7/2007 |
| JP | 2008-101108 | 5/2008 |
| JP | 2008-120076 | 5/2008 |

US 9,296,881 B2

POLYETHYLENE-BASED STRUCTURE

TECHNICAL FIELD

The present invention relates to a polyethylene-based structure that is excellent in barrier property and strength.

BACKGROUND ART

Containers for storing hydrocarbons or various chemicals or pipes for transporting these materials include, for example, bottles for chemicals, fuel tanks for automobiles or small size engines, fuel pipes, etc. Most of metals or glass conventionally used as raw materials of these members have been now replaced with a plastic material as an alternate material therefor. The plastic material has advantages such as a light weight, no need of rust-proof treatment, less occurrence of cracks and a high degree of freedom of a shape, etc., as compared to the metals or glass.

In most of the above applications, a high-density polyethylene (hereinafter occasionally referred to merely as "HDPE") has been used as raw materials of the containers or pipes. The HDPE is excellent in mechanical strength, moldability and economical efficiency. However, the HDPE has such a problem that contents stored in a container made of the HDPE are likely to be permeated through a wall of the HDPE container and dispersed or scattered in atmospheric air. In recent years, regulations against permeation of gasoline through gasoline tanks made of a resin and peripheral members thereof have become much stricter year by year from the viewpoint of avoiding environmental pollution, so that the existing HDPE containers have failed to comply with such stricter regulations. As a result, there is an increasing demand for techniques of enhancing a gas-barrier property of these products.

As a method of enhancing a fuel barrier property of an HDPE container, there is known the method of treating an inner surface of the HDPE container with flon or sulfone (for example, refer to Patent Document 1). In addition, there is known the method of forming an HDPE container having a multilayer wall structure which include an intermediate layer made of a barrier resin such as an ethylene-vinyl alcohol copolymer resin (hereinafter occasionally referred to merely as "EVOH") (for example, refer to Patent Documents 2 and 3). Further, in order to enhance a fuel barrier property of an HDPE container, there is known the method of producing a single-layer container, from a composition prepared by blending HDPE and a polyamide resin such as nylon 6, 66 or EVOH together with an adhesive resin (for example, refer to Patent Documents 4 and 5). Furthermore, there is also disclosed the method in which poly-m-xylylene adipamide (hereinafter occasionally referred to merely as "N-MXD6") having a more excellent barrier property than nylon 6, 66 is used in the above blended resin single-layer container (for example, refer to Patent Documents 6 and 7).

CITATION LIST

Patent Literature

[Patent Document 1]: JP 60-006735A
[Patent Document 2]: JP 06-328634A
[Patent Document 3]: JP 07-052333A
[Patent Document 4]: JP 55-121017A
[Patent Document 5]: JP 58-209562A
[Patent Document 6]: JP 2005-206806A
[Patent Document 7]: JP 2007-177208A

SUMMARY OF INVENTION

Technical Problem

In the method described in Patent Document 1 in which an inner surface of the HDPE container is subjected to flon treatment or sulfone treatment, there is present such an advantage that existing facilities for production of the conventional HDPE container can be applied as such to these treatments. However, in this method, it is necessary to ensure a safety against harmful gases generated upon the fluorinating treatment, or there tend to occur the problems concerning a recovery method after the treatment as well as disadvantages such as difficulty in quality inspection after the fluorinating treatment.

The multilayer containers described in Patent Documents 2 and 3 which are produced from HDPE and EVOH can be imparted with a more excellent barrier property than the conventional HDPE containers and can be well controlled in barrier property by adjusting a thickness of the EVOH layer laminated therein. Therefore, according to Patent Documents 2 and 3, it may be possible to readily produce a container having a desired barrier property. However, exiting facilities for production of the HDPE single-layer containers are not applicable to production of such multilayer containers, and it is therefore required that a special multilayer blow-molding device equipped with at least three extruders is additionally installed therein in order to extrude HDPE, an adhesive resin and EVOH, respectively, which will result in problem of high costs.

Meanwhile, the HDPE containers have been frequently produced by a direct blow method. The direct blow method is a molding method in which a resin composition melted and mixed in an extruder is extruded therefrom through a cylindrical die to form a tubular molten body (hereinafter occasionally referred to merely as a "parison"), and then the parison is interposed between halves of a metal die and inflated by blowing a gas such as air thereinto to allow the parison to come into close contact with an inside of the metal die and thereby produce a desired molded article therefrom. The containers produced by the direct blow method inevitably have a so-called pinch-off portion formed upon biting off the parison by the metal die. The pinch-off portion of the parison is formed by causing adjacent inner surface portions of the parison to adhere to each other. The adhesion strength of the pinch-off portion of the parison tends to become insufficient depending upon molding conditions or kinds of materials constituting the parison, which may induce the problems such as a poor strength of the resulting structure. In the above multilayer container, a mating surface between adjacent portions of the inner HPDE layer is formed in a section of the pinch-off portion, so that the container tends to have a portion in which an EVOH layer is cut off. When the container has a very small wall thickness, the thickness of the mating surface between adjacent portions of the inner HPDE layer in the pinch-off portion thereof becomes very small, so that no significant problems tend to be practically caused. However, in the case of a fuel container requiring a high strength in which a thickness of an inner HPDE layer is in general set to a large thickness, there tends to occur such a problem that a fuel is readily permeated through a mating surface between adjacent portions of the inner HPDE layer.

The methods described in Patent Documents 4 and 5 in which nylon 6, 66 is dispersed in a layer form in HDPE may be substantially put into practice by using the exiting facilities for production of the conventional HDPE containers as such, and since the polyamide resin is dispersed in a layer form in the composition, the resulting containers can be imparted with a good barrier property almost similar to that of a multilayer structure. Resin materials forming cut chips or purgings generated upon production of these containers are the same as those resin materials forming the containers themselves. Therefore, unlike the fluorinated resin containers, by milling the cut chips or purgings using a milling machine and charging the milled material as a recycling material into an extruder, it is possible to reuse the cut chips or purgings as one of raw materials constituting these containers.

However, the nylon 6, 66 used as a barrier resin in the above conventional containers fails to exhibit a so excellent barrier property by itself. Therefore, the barrier property of the nylon 6, 66 tends to frequently become still insufficient to meet the recent much stricter requirement for barrier property. In addition, in order to allow the nylon 6, 66 to exhibit a good barrier property, it is required to strictly control molding conditions of a resin composition such that the dispersing condition of the nylon 6, 66 in the composition becomes close to an ideal dispersing condition thereof, which tends to frequently result in inapplicability of the nylon 6, 66 to recent molding processes for production of containers having various shapes.

According to the methods described in Patent Documents 6 and 7 in which N-MXD6 is used as a barrier resin in place of the nylon 6, 66, since the barrier resin itself has a considerably excellent barrier property, it is possible to obtain a container that is more excellent in barrier property than that produced using the nylon 6, 66. However, even the N-MXD6 tends to fail to fully meet recent requirements for barrier property which become stricter year by year.

The problem to be solved by the present invention is to provide a polyethylene-based structure which is capable of satisfying recent strict requirements for barrier property and can exhibit an excellent strength.

Solution to Problem

The present invention provides the following polyethylene-based structures.

<1> A polyethylene-based structure including from 60 to 90% by mass of a polyethylene (A), from 5 to 35% by mass of an acid-modified polyethylene (B) and from 5 to 35% by mass of a m-xylylene group-containing polyamide (C), in which the m-xylylene group-containing polyamide (C) is dispersed in a layer form in the polyethylene (A) to partially form a continuous phase thereof, and has a relative viscosity of from 2.5 to 4.5, and the polyethylene-based structure satisfies the following Requirement 1 or 2:

(Requirement 1):

(1-1): the polyethylene (A) is a high-density polyethylene (Aa) having a density of from 0.94 to 0.97 and a melt flow rate (MFR) of from 0.1 to 0.6, and (1-2): the acid-modified polyethylene (B) has a density of from 0.90 to 0.935 and a melt flow rate (MFR) that is in the range of from 3 to 10 times the MFR of the high-density polyethylene (Aa); or (Requirement 2):

the polyethylene (A) is in the form of a mixture of a polyethylene (A1) having a density of from 0.935 to 0.965 and a polyethylene (A2) having a density of from 0.91 to 0.93, and a mass ratio of the polyethylene (A1) to the polyethylene (A2) ((A1)/(A2)) is from 70/30 to 95/5.

<2> A polyethylene-based structure including from 60 to 90% by mass of a high-density polyethylene (Aa), from 5 to 35% by mass of an acid-modified polyethylene (B) and from 5 to 35% by mass of a m-xylylene group-containing polyamide (C), in which the m-xylylene group-containing polyamide (C) is dispersed in a layer form in the high-density polyethylene (Aa) to partially form a continuous phase thereof, and the polyethylene-based structure satisfies all of the following (1) to (3):

(1): the high-density polyethylene (Aa) has a density of from 0.94 to 0.97 and a melt flow rate (MFR) of from 0.1 to 0.6, (2): the acid-modified polyethylene (B) has a density of from 0.90 to 0.935 and a melt flow rate (MFR) that is in the range of from 3 to 10 times the MFR of the high-density polyethylene (Aa); and (3): the m-xylylene group-containing polyamide (C) has a relative viscosity of from 2.5 to 4.5.

<3> A polyethylene-based structure including from 60 to 90% by mass of a polyethylene (A), from 5 to 25% by mass of an acid-modified polyethylene (B) and from 5 to 35% by mass of a m-xylylene group-containing polyamide (C), in which the m-xylylene group-containing polyamide (C) is dispersed in a layer form in the polyethylene (A) to partially form a continuous phase thereof; the polyethylene (A) is in the form of a mixture of a polyethylene (A1) having a density of from 0.935 to 0.965 and a polyethylene (A2) having a density of from 0.91 to 0.93, and a mass ratio of the polyethylene (A1) to the polyethylene (A2) ((A1)/(A2)) is from 70/30 to 95/5; and the m-xylylene group-containing polyamide (C) has a relative viscosity of from 2.5 to 4.5.

In the following, the polyethylene-based structure described in the above <2> is referred to as a "first embodiment of the present invention", and the polyethylene-based structure described in the above <3> is referred to as a "second embodiment of the present invention".

Advantageous Effects of Invention

The polyethylene-based structure according to the present invention is excellent in barrier property against fuels and chemicals or barrier property against various gases such as oxygen, and further can exhibit a practical strength.

DESCRIPTION OF EMBODIMENTS (Polyethylene (A))

Figure 1:
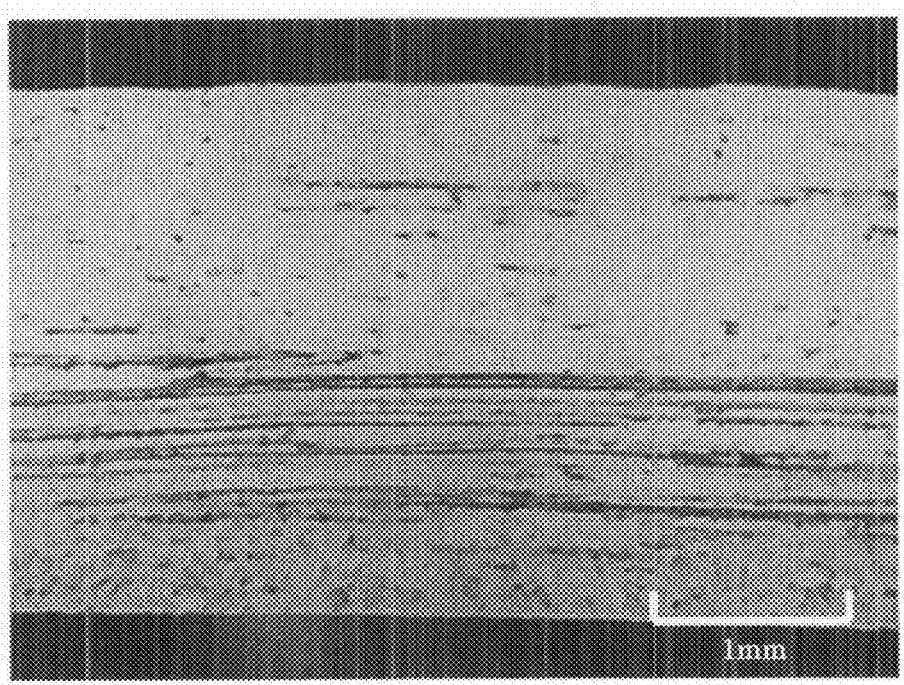
FIG. 1 is a micrograph showing a section of a side wall of a tank produced in Example 101.

The polyethylene (A) used in the present invention is a main material constituting a container of the present invention. The polyethylene (A) used in the first embodiment of the present invention is a high-density polyethylene (Aa). The polyethylene (A) used in the second embodiment of the present invention is in the form of a mixture of at least two kinds of polyethylenes including a polyethylene (A1) and a polyethylene (A2) which are different in density from each other.

<High-Density Polyethylene (Aa) and Polyethylene (A1)>

The high-density polyethylene (Aa) used in the first embodiment of the present invention and the polyethylene (A1) used in the second embodiment of the present invention are preferably controlled to each have a specific melt viscosity, molecular weight and crystallinity from the viewpoints of preventing occurrence of drawdown causing unevenness in thickness of the resulting molded article, enhancing a strength of the structure itself, and suppressing occurrence of breaks or cracks upon falling or upon applying impact thereon.

The high-density polyethylene (Aa) used in the first embodiment of the present invention and the polyethylene (A1) used in the second embodiment of the present invention serve for enhancing a strength, a chemical resistance, etc., of the resulting container and therefore preferably have a high crystallinity. As an index of a crystallinity of the polyethylene, there may be used a density of the polyethylene.

The high-density polyethylene (Aa) used in the first embodiment of the present invention has a density of from 0.94 to 0.97, preferably from 0.943 to 0.965 and more preferably from 0.945 to 0.96. The polyethylene (A1) used in the second embodiment of the present invention has a density of from 0.935 to 0.965, preferably from 0.938 to 0.965 and more preferably from 0.94 to 0.96.

Either when the high-density polyethylene (Aa) used in the first embodiment of the present invention has a density of less than 0.94 or when the polyethylene (A1) used in the second embodiment of the present invention has a density of less than 0.935, the resulting structure tends to be insufficient in crystallinity, so that storage of contents in the structure tends to be difficult depending upon kinds of the contents accommodated therein. On the other hand, either when the high-density polyethylene (Aa) used in the first embodiment of the present invention has a density of more than 0.97 or when the polyethylene (A1) used in the second embodiment of the present invention has a density of more than 0.965, the polyethylene (Aa) or (A1) itself tends to become brittle like glass, and the resulting structure may undesirably fail to exhibit a practical strength.

As an index of each of a melt viscosity and a molecular weight of a polyethylene, there may be typically used a melt flow rate (MFR) of the polyethylene. The MFR of the high-density polyethylene (Aa) used in the first embodiment of the present invention is from 0.1 to 0.6 (g/10 min), preferably from 0.1 to 0.55 (g/10 min) and more preferably from 0.15 to 0.5 (g/10 min) as measured at 190° C. under a load of 2.16 kgf according to the method described in JIS K 7210. The MFR of the high-density polyethylene (A1) used in the second embodiment of the present invention is from 0.05 to 0.6 (g/10 min), preferably from 0.1 to 0.55 (g/10 min) and more preferably from 0.15 to 0.5 (g/10 min) as measured at 190° C. under a load of 2.16 kgf according to the method described in JIS K 7210.

In general, a m-xylylene group-containing polyamide has a larger density than that of a polyethylene, so that a composition prepared by compounding the m-xylylene group-containing polyamide with the polyethylene tends to suffer from large drawdown upon molding as compared to the polyethylene solely. For this reason, when the MFR of the high-density polyethylene (Aa) used in the first embodiment of the present invention is more than 0.6, the resulting molded article tends to be deteriorated in accuracy of a thickness thereof owing to occurrence of excessively large drawdown upon molding. When the MFR of the high-density polyethylene (Aa) used in the first embodiment of the present invention is less than 0.1, it tends to be difficult to disperse the m-xylylene group-containing polyamide (C) in the polyethylene in a good condition, owing to an excessively high melt viscosity of the polyethylene. On the other hand, when the MFR of the polyethylene (A1) used in the second embodiment of the present invention lies within the range of from 0.05 to 0.6, the resulting molded article can be prevented from suffering from deterioration in accuracy of a thickness thereof owing to occurrence of excessively large drawdown upon molding, and the m-xylylene group-containing polyamide (C) can be dispersed in the polyethylene in a good condition.

<Polyethylene (A2)>

The polyethylene (A2) used in the second embodiment of the present invention is added for the purposes of reducing such a tendency that the resulting structure becomes hard and brittle owing to poor dispersion of the m-xylylene group-containing polyamide (C) therein as well as preventing occurrence of drawdown owing to a high specific gravity of the obtained composition. The density of the polyethylene (A2) used in the second embodiment of the present invention is from 0.91 to 0.93, preferably from 0.913 to 0.928 and more preferably from 0.915 to 0.925. When the density of the polyethylene (A2) is less than 0.91, the polyethylene (A2) tends to have a less affinity with the polyethylene (A1), so that the resulting container tends to be deteriorated in strength. When the density of the polyethylene (A2) is more than 0.93, the density of the polyethylene (A2) becomes closer to that of the polyethylene (A1), so that there tend to occur adverse influences such as deterioration in strength of the resulting container and deterioration in dimensional accuracy of the resulting structure owing to large drawdown of the obtained composition upon molding.

As described above, the polyethylene (A2) used in the second embodiment of the present invention serves for reducing occurrence of drawdown owing to addition of the m-xylylene group-containing polyamide (C) to the composition. From these viewpoints, the polyethylene (A2) used in the second embodiment of the present invention preferably has an MFR close to that of the polyethylene (A1). On the other hand, the polyethylene (A2) also serves for enhancing an affinity (compatibility) between the acid-modified polyethylene (B) having a relatively low viscosity and the polyethylene (A1).

From these viewpoints, the MFR of the polyethylene (A2) used in the second embodiment of the present invention is preferably 0.5 to 8 times, more preferably from 0.8 to 6 times and still more preferably from 1 to 5 times the MFR of the polyethylene (A1). When the MFR of the polyethylene (A2) lies within the range of 0.5 to 8 times the MFR of the polyethylene (A1), the compatibility between the acid-modified polyethylene (B) and the polyethylene (A1) can be enhanced while reducing occurrence of drawdown upon molding and preventing deterioration in dimensional accuracy of the resulting structure. As a result, it is possible to suppress migration of the acid-modified polyethylene (B) to an outside portion of the structure or, in some cases, exposure of the m-xylylene group-containing polyamide (C) having a good affinity with the acid-modified polyethylene (B) onto an outer surface of the structure, and prevent deterioration in appearance and barrier property of the structure.

In the second embodiment of the present invention, the mass ratio [(A1)/(A2)] of the polyethylene (A1) to the polyethylene (A2) in the polyethylene (A) is preferably from 70/30 to 95/5, more preferably from 73/27 to 92/8 and still more preferably from 75/25 to 90/10 with the proviso that a total amount of the polyethylene (A1) and the polyethylene (A2) is 100% by mass. When the content of the polyethylene (A1) in the polyethylene (A) is less than 70% by mass, the resulting structure tends to be deteriorated in crystallinity and therefore tends to suffer from practical problems such as a poor chemical resistance and an excessive softness. When the content of the polyethylene (A1) in the polyethylene (A) is more than 95% by mass, the effect attained by mixing the polyethylene (A2) in the composition tends to be eliminated, so that there tend to occur adverse influences such as deterioration in strength of the resulting container and deterioration in dimensional accuracy of the resulting structure owing to large drawdown of the obtained composition upon molding.

The polyethylene (A) used in the present invention may be compounded with various additives such as an antioxidant, a delustering agent, a heat stabilizer, a weathering stabilizer, an ultraviolet absorber, a nucleating agent, a plasticizer, a flame retardant, an antistatic agent, an anti-coloring agent and a lubricant unless the addition thereof adversely affects the aimed effects of the present invention. Further, various suitable materials other than the aforementioned additives may also be mixed in the composition without imposing any particular limitations thereon.

(Acid-Modified Polyethylene (B))

The acid-modified polyethylene (B) used in the present invention may be prepared by graft-modifying a polyethylene with an unsaturated carboxylic acid or an anhydride thereof, and is in general extensively used as an adhesive resin. In the present invention, the acid-modified polyethylene (B) serves for allowing the polyethylene (A) and the m-xylylene group-containing polyamide (C) dispersed in the polyethylene (A) to adhere to each other to thereby maintain a good strength of the resulting structure.

Specific examples of the aforementioned unsaturated carboxylic acid or anhydride thereof include acrylic acid, methacrylic acid, α-ethyl acrylic acid, maleic acid, fumaric acid, itaconic acid, citraconic acid, tetrahydrophthalic acid, chloromaleic acid, butenyl succinic acid and anhydrides of these acids. Among these unsaturated carboxylic acids or anhydrides, preferred are maleic acid and maleic anhydride. As a method of graft-copolymerizing a polyethylene with the aforementioned unsaturated carboxylic acid or anhydride thereof to obtain the acid-modified polyethylene, there may be used various conventionally known methods. For example, there may be used the method of melting a polyethylene using an extruder, etc., and then adding a graft monomer to the molten polyethylene to copolymerize the monomer with the polyethylene, the method of dissolving a polyethylene in a solvent and then adding a graft monomer to the resulting solution to copolymerize the monomer with the polyethylene, the method of preparing a water suspension of a polyethylene and then adding a graft monomer to the water suspension to copolymerize the monomer with the polyethylene, or the like.

In general, the m-xylylene group-containing polyamide is a relatively hard material. Therefore, there tend to occur cracks or peeling at an interface between the m-xylylene group-containing polyamide and the other materials when any impact is applied to the structure, thereby causing deterioration in strength or barrier property of the structure. For this reason, the acid-modified polyethylene (B) used in the present invention is suitably in the form of a relatively soft material having a relatively low density because the use of such a material as the acid-modified polyethylene (B) is effective to reduce deterioration in impact strength of the resulting structure owing to inclusion of the m-xylylene group-containing polyamide (C) and maintain a practical strength of the structure.

From these viewpoints, the density of the acid-modified polyethylene (B) used in the first embodiment of the present invention is from 0.90 to 0.935, preferably from 0.905 to 0.932 and more preferably from 0.91 to 0.93. Also, the density of the acid-modified polyethylene (B) used in the second embodiment of the present invention is preferably from 0.90 to 0.935, more preferably from 0.905 to 0.932 and still more preferably from 0.91 to 0.93.

When using the acid-modified polyethylene (B) having a density of from 0.90 to 0.935, it is possible to attain a good compatibility between the polyethylene (A) and the acid-modified polyethylene (B) and enhance an adhesion property to the m-xylylene group-containing polyamide (C) to thereby allow the resulting structure to exhibit an increased strength, and further it is possible to prevent deterioration in strength of the structure when applying impact or the like thereto.

In addition, the MFR of the acid-modified polyethylene (B) used in the first embodiment of the present invention is from 3 to 10 times, preferably from 3.2 to 9 times and more preferably from 3.5 to 8 times the MFR of the high-density polyethylene (Aa). When the MFR of the acid-modified polyethylene (B) is less than 3 times the MFR of the high-density polyethylene (Aa), as described hereinlater, there tends to occur such a tendency that the m-xylylene group-containing polyamide (C) is present in a large amount even on an inner surface side of the parison so that the resulting structure is deteriorated in adhesion strength of a pinch-off portion thereof. On the other hand, when the MFR of the acid-modified polyethylene (B) is more than 10 times the MFR of the high-density polyethylene (Aa), the m-xylylene group-containing polyamide (C) tends to sometimes suffer from bleeding onto a surface of the resulting structure so that the structure tends to be deteriorated in appearance and barrier property.

In the following, the reason why the MFR of the acid-modified polyethylene (B) is defined to lie within the range of from 3 to 10 times the MFR of the high-density polyethylene (Aa) in the first embodiment of the present invention is explained in more detail.

The polyethylene-based structure according to the present invention may be produced by various molding methods. In particular, a direct blow method is suitably used for the purpose of enhancing a barrier property of the resulting structure. In the direct blow method, the resin composition melted and mixed in an extruder is extruded from a cylindrical die to form a tubular molten body (hereinafter occasionally referred to merely as a "parison"), and the parison is interposed between halves of a metal die and inflated by blowing a gas such as air thereinto and allowed to come into close contact with an inner surface of the metal die to produce a molded article. The structure produced by this method is inevitably formed with a portion that is bit off by the metal die (hereinafter occasionally referred to as a "pinch-off portion"). The pinch-off portion is formed by allowing adjacent inner surface portions of the parison to adhere to each other, and tends to be insufficient in adhesion between the portions depending upon molding conditions or kinds of materials constituting the parison, thereby causing an insufficient strength of the resulting structure.

The molding process for production of the polyethylene-based structure according to the present invention which contains the m-xylylene group-containing polyamide (C) may be carried out at a temperature as low as possible as described hereinafter in order to maintain a good dispersing condition of the m-xylylene group-containing polyamide (C) while preventing deterioration of the polyethylene owing to oxidation thereof. In such a condition, the m-xylylene group-containing polyamide (C) is kept in a softened state near a melting point thereof. For this reason, even when portions formed of the m-xylylene group-containing polyamide (C) kept in such a softened state come into contact with each other, an adhesion strength therebetween tends to be very low.

Therefore, in the present invention, from the viewpoint of attaining a good adhesion property of the pinch-off portion, it is important that the dispersing condition of the m-xylylene group-containing polyamide (C) in the parison is controlled such that the amount of the m-xylylene group-containing polyamide (C) present on an inner surface side of the parison is as small as possible.

Meanwhile, in general, when rotating a screw disposed on a center axis of an extruder to knead resins that are different in melt viscosity from each other in the extruder, the resins are melted and kneaded by a shear force produced by rotation of the screw. At this time, within the extruder, the resin having a lower melt viscosity is moved toward an outside of the extruder relative to its rotating axis (side of a cylinder wall inner surface of the extruder). As a result, it is suggested that the resin having a relatively high viscosity is present in a large amount near the screw in the extruder, whereas the resin having a low viscosity is present near the cylinder wall inner surface of the extruder.

For this reason, in the first embodiment of the present invention in which the MFR of the acid-modified polyethylene (B) is defined to lie within the range of from 3 to 10 times the MFR of the high-density polyethylene (Aa), the acid-modified polyethylene (B) having a higher MFR (i.e., having a lower melt viscosity) than that of the high-density polyethylene (Aa) and the m-xylylene group-containing polyamide (C) having a good adhesion to the acid-modified polyethylene (B) are present in a relatively large amount near the cylinder wall inner surface rather than near the screw in the extruder. The resin composition is extruded from the extruder through a cylindrical die under a pressure applied by the extruder without being subsequently mixed, so that the m-xylylene group-containing polyamide (C) is mainly present in a large amount on an outer surface side of the resulting parison with respect to a center of a wall of the parison as viewed in a section of the parison. As a result, since an inner surface side portion of the parison is substantially constituted of polyethylene, the adhesion strength of the pinch-off portion is substantially identical to an adhesion strength of a structure constituted of a polyethylene solely. In addition, owing to the fact that the m-xylylene group-containing polyamide (C) is present in a large amount on an outer surface side of the parison with respect to a center of the wall of the parison, the m-xylylene group-containing polyamide (C) is dispersed in a layer form near an outer surface side of the resulting container with respect to a center of a wall of the container to form a continuous phase thereof, as compared to a container of the conventional art in which the polyamide is uniformly dispersed in a layer form over an entire portion of a wall of the container (for example, refer to JP 2007-177208A), so that the resulting structure can be improved in barrier property more effectively than conventionally.

On the other hand, the MFR of the acid-modified polyethylene (B) used in the second embodiment of the present invention is preferably 3 to 10 times, more preferably from 3.2 to 9 times and still more preferably from 3.5 to 8 times the MFR of the polyethylene (A1) as a main component of the polyethylene (A). When the MFR of the acid-modified polyethylene (B) lies within the range of 3 to 10 times the MFR of the polyethylene (A1), it is possible to inhibit deterioration in adhesion strength of the pinch-off portion of the resulting structure, suppress bleeding of the m-xylylene group-containing polyamide (C) on a surface of the structure, and prevent deterioration in appearance and barrier property of the structure.

Meanwhile, the acid-modified polyethylene (B) used in the present invention preferably has a high melt viscosity from the viewpoints of a good molding stability and retention of a good strength of the resulting structure. The MFR of the acid-modified polyethylene (B) is preferably from 0.5 to 5 (g/10 min), more preferably from 0.6 to 4 (g/10 min) and still more preferably 0.7 to 3 (g/10 min) as measured at 190° C. under a load of 2.16 kgf according to the method described in JIS K 7210.

The acid-modified polyethylene (B) may also be compounded with various additives such as an antioxidant, a delustering agent, a heat stabilizer, a weathering stabilizer, an ultraviolet absorber, a nucleating agent, a plasticizer, a flame retardant, an antistatic agent, an anti-coloring agent and a lubricant unless the addition thereof adversely affects the aimed effects of the present invention. Further, various suitable materials other than the aforementioned additives may also be mixed in the composition without imposing any particular limitations thereon.

(m-Xylylene Group-Containing Polyamide (C))

The m-xylylene group-containing polyamide (C) used in the present invention is a material serving for enhancing a barrier property of the resulting structure. The diamine unit of the m-xylylene group-containing polyamide (C) preferably contains a m-xylylenediamine unit in an amount of 70 mol % or more, more preferably 80 mol % or more and still more preferably 90 mol % or more from the viewpoint of a good barrier property of the resulting structure.

Examples of diamines other than m-xylylenediamine which may be used in the diamine unit of the m-xylylene group-containing polyamide (C) in the present invention include, but are not limited to, p-xylylenediamine, 1,3-bis(aminomethyl)cyclohexane, 1,4-bis(aminomethyl)cyclohexane, tetramethylenediamine, hexamethylenediamine, nonamethylenediamine and 2-methyl-1,5-pentanediamine.

The dicarboxylic acid unit constituting the m-xylylene group-containing polyamide (C) preferably contains an α,ω-aliphatic dicarboxylic acid in an amount of 50 mol % or more, more preferably 60 mol % or more and still more preferably 70 mol % or more from the viewpoint of a good crystallinity of the resulting structure.

Examples of the a,w-aliphatic dicarboxylic acid include suberic acid, adipic acid, azelaic acid, sebacic acid and dodecanoic acid. Among these ow-aliphatic dicarboxylic acids, adipic acid and sebacic acid are preferred from the viewpoint of good gas barrier property and crystallinity of the resulting structure.

Examples of dicarboxylic acids other than the α,ω-aliphatic dicarboxylic acid which may be used in the dicarboxylic acid unit of the m-xylylene group-containing polyamide (C) in the present invention include, but are not limited to, alicyclic dicarboxylic acids such as 1,3-cyclohexanedicarboxylic acid and 1,4-cyclohexanedicarboxylic acid, and aromatic dicarboxylic acids such as terephthalic acid, isophthalic acid, orthophthalic acid, xylylenedicarboxylic acid and naphthalenedicarboxylic acid.

Among these dicarboxylic acids, isophthalic acid and 2,6-naphthalenedicarboxylic acid are preferred because they are capable of readily producing a polyamide having an excellent barrier property without inhibiting a polycondensation reaction upon production of the m-xylylene group-containing polyamide (C). The content of isophthalic acid or 2,6-naphthalenedicarboxylic acid in the dicarboxylic acid unit of the m-xylylene group-containing polyamide (C) is preferably 30 mol % or less, more preferably 20 mol % or less and still more preferably 15 mol % or less from the viewpoints of a good dispersibility of the m-xylylene group-containing polyamide (C) in the polyethylene-based structure and a good barrier property of the structure.

Further, the m-xylylene group-containing polyamide (C) may also contain any other constitutional units in addition to the aforementioned diamine unit and dicarboxylic acid unit unless the use thereof adversely affects the aimed effects of the present invention. Examples of the other constitutional units usable as a comonomer unit of the m-xylylene group-containing polyamide (C) include lactams such as c-caprolactam and laurolactam, aliphatic aminocarboxylic acids such as aminocaproic acid and aminoundecanoic acid, and aromatic aminocarboxylic acids such as p-aminomethylbenzoic acid.

The m-xylylene group-containing polyamide (C) may be produced by a melt polycondensation method (melt polymerization method). For example, there may be used the method of subjecting a nylon salt constituted of a diamine and a dicarboxylic acid to polymerization reaction in a molten state in the presence of water while heating under pressure and removing water added and condensed water produced. Further, the m-xylylene group-containing polyamide (C) may be produced by the method of directly adding a diamine to a dicarboxylic acid kept in a molten state to conduct a polycondensation reaction therebetween. In this method, in order to maintain the reaction system in a uniform liquid state, the diamine is continuously added to the dicarboxylic acid, and during such a period, the polycondensation reaction is allowed to proceed while heating the reaction system such that the reaction temperature is not dropped below a melting point of an oligoamide or a polyamide produced.

In addition, a phosphorus atom-containing compound may be added to the polycondensation reaction system for production of the m-xylylene group-containing polyamide (C) for the purposes of attaining the effect of accelerating an amidation reaction or the effect of preventing undesirable coloration upon the polycondensation.

Examples of the phosphorus atom-containing compound include dimethyl phosphinic acid, phenylmethyl phosphinic acid, hypophosphorous acid, sodium hypophosphite, potassium hypophosphite, lithium hypophosphite, ethyl hypophosphite, phenylphosphonous acid, sodium phenylphosphonite, potassium phenylphosphonite, lithium phenylphosphonite, ethyl phenylphosphonite, phenylphosphonic acid, ethylphopsphonic acid, sodium phenylphosphonate, potassium phenylphosphonate, lithium phenylphosphonate, diethyl phenylphosphonate, sodium ethylphosphonate, potassium ethylphosphonate, phosphorous acid, sodium hydrogen phosphite, sodium phosphite, triethyl phosphite, triphenyl phosphite and pyrophosphorous acid. Among these phosphorus atom-containing compounds, hypophosphorous acid metal salts such as sodium hypophosphite, potassium hypophosphite and lithium hypophosphite are preferably used because they exhibit a high effect of accelerating the amidation reaction and are excellent in effect of preventing undesirable coloration. Of these hypophosphorous acid metal salts, especially preferred is sodium hypophosphite. However, the phosphorus atom-containing compound that can be used in the present invention is not particularly limited to the aforementioned compounds.

The amount of the phosphorus atom-containing compound added to the polycondensation reaction system for production of the m-xylylene group-containing polyamide (C) is preferably from 1 to 500 ppm, more preferably from 5 to 450 ppm and still more preferably from 10 to 400 ppm in terms of a concentration of a phosphorus atom in the m-xylylene group-containing polyamide (C) from the viewpoint of preventing undesirable coloration of the m-xylylene group-containing polyamide (C) during the polycondensation reaction.

Further, an alkali metal compound or an alkali earth metal compound is preferably added in combination with the phosphorus atom-containing compound to the polycondensation reaction system for production of the m-xylylene group-containing polyamide (C). Thus, in order to effectively prevent undesirable coloration of the m-xylylene group-containing polyamide (C) during the polycondensation reaction, it is required that the phosphorus atom-containing compound is allowed to be present in a sufficient amount in the polycondensation reaction system. Further, in order to well control the amidation reaction rate, it is preferred that the alkali metal compound or alkali earth metal compound is allowed to coexist in the polycondensation reaction system.

Examples of the alkali metal compound or alkali earth metal compound include, but are not limited to, hydroxides of alkali metals and alkali earth metals such as lithium hydroxide, sodium hydroxide, potassium hydroxide, rubidium hydroxide, cesium hydroxide, magnesium hydroxide, calcium hydroxide and barium hydroxide; and acetates of alkali metals and alkali earth metals such as lithium acetate, sodium acetate, potassium acetate, rubidium acetate, cesium acetate, magnesium acetate, calcium acetate and barium acetate.

The amount of the alkali metal compound or alkali earth metal compound added to the polycondensation reaction system for production of the m-xylylene group-containing polyamide (C) may be controlled such that the value obtained by dividing the number of moles of the alkali metal compound or alkali earth metal compound added by the number of moles of the phosphorus atom-containing compound added is preferably in the range of from 0.5 to 2.0, more preferably from 0.6 to 1.8 and still more preferably from 0.7 to 1.5. When the amount of the alkali metal compound or alkali earth metal compound added to the polycondensation reaction system is controlled to the above-specified range, it is possible to suppress production of a gel while attaining the effect of accelerating the amidation reaction by the phosphorus atom-containing compound.

The m-xylylene group-containing polyamide (C) obtained by the melt polycondensation is once withdrawn from the reaction system, pelletized and then dried before used. In addition, the m-xylylene group-containing polyamide (C) may be further subjected to solid-state polymerization in order to enhance a polymerization degree thereof. Examples of a heating device used in the drying or solid-state polymerization step include a continuous type heating dryer, a rotary drum type heater such as those heaters called a tumbler dryer, a conical dryer and a rotary dryer, and a conical type heater equipped therein with a rotating blade such as a Nauta mixer. However, the method of conducting the drying or solid-state polymerization step is not particularly limited, and the drying or solid-state polymerization step may be conducted using any known methods and devices. In particular, when subjecting the resulting polyamide to solid-state polymerization, the use of the rotary drum type heater among the above devices is preferred because the heater of such a type is capable of providing a closed system and allowing the polycondensation reaction to readily proceed under such a condition that oxygen causing undesirable coloration of the resulting product is removed.

As an index of a polymerization degree of the m-xylylene group-containing polyamide (C), there may be used several characteristic values of the m-xylylene group-containing polyamide (C) and may be generally used a relative viscosity thereof. The relative viscosity of the m-xylylene group-containing polyamide (C) used in the present invention is from 2.5 to 4.5, preferably from 2.6 to 4.2 and more preferably from 2.7 to 4.0. When the relative viscosity of the m-xylylene group-containing polyamide (C) is adjusted to the above-specified range, it is possible to attain a stable moldability of the resulting resin composition, and obtain a structure having a good appearance in which the m-xylylene group-containing polyamide (C) is dispersed in a layer form.

In the present invention, in order to enhance an adhesion strength of the pinch-off portion of the resulting structure, the respective raw materials having specific properties are used therein, and the content of the m-xylylene group-containing polyamide (C) in an inner surface side portion of the parison is reduced. As a result, it is likely to form a portion having a higher concentration of the m-xylylene group-containing polyamide (C) as compared to those structures of the conventional art. For this reason, when the relative viscosity of the m-xylylene group-containing polyamide (C) is less than 2.5, the resulting structure tends to is deteriorated in strength as compared to those structures of the conventional art. On the other hand, when the relative viscosity of the m-xylylene group-containing polyamide (C) is more than 4.5, the dispersing condition of the m-xylylene group-containing polyamide (C) in the resin composition tends to be hardly controlled, so that the moldability of the composition tends to be unstable.

Meanwhile, the relative viscosity as used herein means a ratio of a falling time (t) in a solution prepared by dissolving 1 g of a polyamide in 100 mL of 96% sulfuric acid as measured at 25° C. using a Canon Fenske viscometer to a falling time ($t_0$) in the 96% sulfuric acid itself as measured in the same manner. The relative viscosity is calculated from the following formula:

Relative Viscosity=$(t)/(t_0)$

In addition, the m-xylylene group-containing polyamide (C) used in the present invention preferably contains components having a number-average molecular weight of 1000 or less as measured by GPC in an amount of 2% by mass or less, more preferably 1.5% by mass or less, and still more preferably 1% by mass or less from the viewpoints of good appearance and barrier property of the resulting structure. In order to obtain the aforementioned m-xylylene group-containing polyamide (C), the m-xylylene group-containing polyamide (C) produced by the melt polycondensation is preferably subjected to rinsing with hot water, vacuum drying or solid-state polymerization to remove oligomers therefrom.

The m-xylylene group-containing polyamide (C) may also be compounded with various additives such as an antioxidant, a delustering agent, a heat stabilizer, a weathering stabilizer, an ultraviolet absorber, a nucleating agent, a plasticizer, a flame retardant, an antistatic agent, an anti-coloring agent, a lubricant and an anti-gelling agent as well as clays such as phyllosilicates or nano fillers unless the addition thereof adversely affects the aimed effects of the present invention. In addition, for the purpose of modifying the m-xylylene group-containing polyamide (C), various polyamides such as nylon 6, nylon 66 and non-crystalline nylons produced using an aromatic dicarboxylic acid as a monomer or modified resins thereof, polyolefins or modified resins thereof, elastomers containing styrene in a skeleton thereof or the like may be added thereto, if required. Various suitable materials other than the aforementioned materials may also be mixed in the composition without imposing any particular limitations thereon.

In the structure of the present invention, the particles of the m-xylylene group-containing polyamide (C) dispersed therein preferably have a major axis diameter of 0.5 mm or more, more preferably 1 mm or more, and still more preferably 2 mm or more. In addition, when observing a section of a molded article in such an enlarged scale that a thickness of a side wall of the molded article occupies about 80% of one side of a field of view for the observation using a microscope, a ratio of an area occupied by the dispersed particles of the m-xylylene group-containing polyamide (C) which have a major axis diameter of 0.5 mm or more in the field of view to a total area occupied by the whole dispersed particles of the m-xylylene group-containing polyamide (C) therein is preferably 20% or more, more preferably 50% or more and still more preferably 80% or more. When the configuration of the dispersed particles of the m-xylylene group-containing polyamide (C) is controlled such that the area ratio lies within the above-specified range, the m-xylylene group-containing polyamide (C) can be dispersed in a layer form to partially form a continuous phase thereof, and the resulting structure can exhibit a good barrier property.

(Compounding Ratios of Respective Materials)

The compounding ratios of the respective materials constituting the structure of the present invention are controlled such that the contents of the polyethylene (A), the acid-modified polyethylene (B) and the m-xylylene group-containing polyamide (C) in the resulting structure are from 60 to 90% by mass, from 5 to 35% by mass and from 5 to 35% by mass, respectively, preferably from 65 to 90% by mass, from 5 to 30% by mass and from 5 to 30% by mass, respectively, and more preferably from 70 to 90% by mass, from 5 to 25% by mass and from 5 to 25% by mass, respectively. In the second embodiment of the present invention, the contents of the polyethylene (A), the acid-modified polyethylene (B) and the m-xylylene group-containing polyamide (C) in the resulting structure are from 60 to 90% by mass, from 5 to 25% by mass and from 5 to 35% by mass, respectively, preferably from 65 to 90% by mass, from 5 to 20% by mass and from 5 to 30% by mass, respectively, and more preferably from 70 to 90% by mass, from 5 to 15% by mass and from 5 to 25% by mass, respectively.

However, the above compound ratios must be determined such that the total amount of the three components (A) to (C) does not exceed 100% by mass. By controlling the compounding ratios of the respective materials to the above-specified ranges, it is possible to efficiently enhance a barrier property of the resulting structure, and minimize deterioration in strength of the structure. The structure of the present invention preferably consists of the above three components, i.e., the polyethylene (A), the acid-modified polyethylene (B) and the m-xylylene group-containing polyamide (C).

(Other Resins)

In addition, various suitable materials other than the aforementioned materials may also be compounded in the structure unless the addition thereof adversely affects the aimed effects of the present invention. Examples of the other materials include, but are not particularly limited to, polypropylenes such as typically a propylene homopolymer, an ethylene-propylene block copolymer and an ethylene-propylene random copolymer; homopolymers of α-olefins having 3 to 20 carbon atoms such as polybutene-1 and polymethyl pentene; copolymers of cc-olefins having 3 to 20 carbon atoms; copolymers of α-olefins having 3 to 20 carbon atoms with cyclic olefins; ionomers; various modified polyethylenes such as an ethylene-ethyl acrylate copolymer and an ethylene-methyl acrylate copolymer; polystyrene; various polyesters such as polyethylene terephthalate; various polyamides such as nylon 6 and nylon 66; a styrene-butadiene copolymer or hydrogenated products thereof; and various thermoplastic elastomers. In addition, in the first embodiment of the present invention, polyethylenes such as typically low-density polyethylene, medium-density polyethylene and linear low-density polyethylene may also be added to the structure.

(Structure)

The polyethylene-based structure of the present invention may be a molded article having various shapes such as a tank, a bottle and a tube. The structure having a tank shape or a bottle shape is preferably produced by a direct blow method. For example, the structure in the form of a single-layer container may be produced as follows. That is, using a molding machine equipped with an extruder, an adaptor, a cylindrical die, a clamping device, a metal die and a cooler, the polyethylene (A), the acid-modified polyethylene (B) and the m-xylylene group-containing polyamide (C), or a mixed material prepared by dry-blending the above components, if required, with a milled material obtained by milling the molded article, are charged into the extruder and melt-kneaded therein. The melt-kneaded material is extruded through the adaptor and the cylindrical die into a tubular shape (hereinafter occasionally referred to as a "parison"), and interposed between halves of the metal die at the time at which the parison is extruded into an appropriate length, and then air is blown into the parison to inflate the parison and bring the parison into close contact with an inside of the metal die. After cooling, the metal die is opened to take out the resulting molded container therefrom.

Upon producing the structure of the present invention, there may be used any suitable conventionally known extruders. In particular, a single-screw extruder is preferably used because it has an adequate kneading capability and is capable of stably extruding a resin even under a high resin pressure. The screw of the single-screw extruder is usually constructed of three sections including a feed section for transporting a raw material toward a tip end of the extruder, a compression section for completely melting the resin softened by absorbing heat therein and a metering section for controlling an output discharged from the extruder. The above screw is not particularly limited, and any ordinary screw may be used in the present invention. However, a screw having no kneading section which is generally called a full flight, such as those screws called a Dulmage type screw and a Maddock type screw, is preferably used form the viewpoint of preventing excessive dispersion of the m-xylylene group-containing polyamide (C) in the resulting structure. Further, in order to readily control the dispersing condition of the m-xylylene group-containing polyamide (C), there is more preferably used a screw of a rapid compression type which has a relatively short compression section. The full flight screw of a rapid compression type has such a construction that the numbers of pitches of the feed section, compression section and metering section thereof (one pitch means one revolution of the full flight) are preferably from 40 to 60, from 5 to 20 and from 30 to 50, respectively, and more preferably from 45 to 55, from 10 to 15 and from 35 to 45, respectively, with the proviso that the number of whole pitches of the screw is 100. The distance between the pitches may be optional. In addition, there may also be used a so-called double flight screw partially provided with two flights.

Also, in order to maintain such a condition that the m-xylylene group-containing polyamide (C) is dispersed in a layer form by a shear force of the screw, any breaker plate that is usually provided inside of the extruder is not mounted to the extruder. If the breaker plate is mounted in the extruder, the m-xylylene group-containing polyamide (C) dispersed in a layer form within the extruder tends to be divided into pieces through pores perforated in the breaker plate, and may be finely dispersed therein.

A general behavior of dispersing one resin as a smaller amount component in the other resin as a larger amount component in the extruder is as follows. That is, first, the whole resins are softened by heat applied from a heater in the extruder. Then, the resins are melted when applying a shear stress thereto by rotation of the screw. At this time, the smaller amount resin component is more widely extended by the shear stress applied thereto, and then cut into pieces in a layered state (i.e., dispersed) when further applying a shear stress thereto, so that the cut pieces are uniformly scattered (distributed) over an entire portion of the resin mixture. The above procedure is repeated many times, so that the smaller amount resin component is finely and uniformly kneaded in the larger amount resin component.

In the structure of the present invention, in order to effectively enhance a barrier property thereof, it is required that the m-xylylene group-containing polyamide (C) is dispersed in a layer form therein. To attain the above condition, the resin material must be extruded from a tip end of the extruder while the material is kept in such a state that resin pellets are extended into a layer form by the action of a shear stress within the extruder. As a method of realizing such an extrusion procedure, there may be mainly mentioned the method of reducing a rotating speed of the screw and the method of optimizing an extruder temperature to be set. Although the former method of reducing a rotating speed of the screw is considered to be a simpler method, there is such a fear that the method suffers from reduction in production efficiency and deterioration in strength of the resulting container owing to exposure of a parison to atmospheric air for a long period of time, which will result in limited applications thereof. In such a case, there is preferably used the method of controlling a resin temperature in the extruder. More specifically, the resin temperature upon melt-kneading the resin material in the extruder is preferably controlled to lie within the range of a melting point of the m-xylylene group-containing polyamide (C) ±20° C., more preferably within the range of the melting point of the m-xylylene group-containing polyamide (C) ±15° C. and still more preferably within the range of the melting point of the m-xylylene group-containing polyamide (C) ±10° C. As the resin temperature, there is preferably adopted such a temperature of the resin material which is determined by actually measuring a temperature of the resin material extruded from the tip end of the extruder. In the case where a difference between a numerical value of the temperature measured by a thermocouple provided at the tip end of the extruder and an actual temperature of the resin material is known to some extent, the resin temperature may be adjusted by referring to such a known value. When the resin material is melt-kneaded at a resin temperature lower than the "melting point of the m-xylylene group-containing polyamide (C)–(minus) 20° C.", the m-xylylene group-containing polyamide (C) tends to be hardly softened to a sufficient extent so that non-melted pellets tend to be included in the resulting molded article, or an excessive load tends to be undesirably applied to a motor of the extruder. On the other hand, when the resin temperature is higher than the "melting point of the m-xylylene group-containing polyamide (C)+(plus) 20° C.", the m-xylylene group-containing polyamide (C) tends to be completely melted and excessively dispersed by a shear stress exerted by rotation of the screw. As a result, the m-xylylene group-containing polyamide (C) tends to be hardly maintained in such a state as dispersed in a layer form in the resin composition and therefore formed into fine particles, so that the resulting structure tends to be considerably deteriorated in barrier property.

The structure obtained by the method of the present invention may have various shapes, e.g., a container shape such as a bottle, a cup, a tray and a tank, a tube shape and a pipe shape. The structure of the present invention is capable of more effectively suppressing permeation of fuels such as gasoline and kerosene, lubricating oils such as engine oils and brake oils, various sanitary goods such as bleaching agents, detergents and shampoos, chemical substances such as ethanol and oxydol, various beverages such as vegetable juices and milk beverages, various goods such as condiments as well as ingredients contained in these materials therethrough as compared to those structures of the conventional art. Therefore, the structure of the present invention can be effectively used for enhancing a storing property of various products.

EXAMPLES

The present invention will be described in more detail below by referring to the following Examples, etc. Meanwhile, in the following Examples, etc., various properties were evaluated by the following methods.

(1) MFR (g/10 min) of Polyethylene (A) and Acid-Modified Polyethylene (B)

The MFR was measured at 190° C. under a load of 2.16 kgf using a melt indexer available from Toyo Seiki Seisaku-Sho Ltd., according to JIS K 7210.

(2) Density ($g/cm^3$) of Polyethylene (A) and Acid-Modified Polyethylene (B)

Using a sheet forming machine equipped with an extruder, a T-die, a cooling roll, a take-off unit, etc., a single-layer sheet having a thickness of about 1 mm was formed. Next, a test piece having a size of 50 mm in length and 50 mm in width was cut from the thus formed sheet to measure a true specific gravity thereof using a true specific gravity meter.

(3) Relative Viscosity of m-Xylylene Group-Containing Polyamide (C)

One gram of the m-xylylene group-containing polyamide (C) was accurately weighed, and dissolved in 100 mL of 96% sulfuric acid at a temperature of 20 to 30° C. while stirring. After completely dissolving the m-xylylene group-containing polyamide (C) in the acid, 5 mL of the resulting solution were rapidly sampled and placed in a Canon Fenske viscometer. After the viscometer filled with the solution was allowed to stand in a constant temperature oven maintained at 25° C. for 10 min, a falling time (t) in the solution was measured. Also, a falling time ($t_0$) in the 96% sulfuric acid itself was measured under the same conditions as used above. The relative viscosity of the m-xylylene group-containing polyamide (C) was calculated from the thus measured falling times t and $t_0$ according to the following formula:

Relative Viscosity=$(t)/(t_0)$ (4) Content (%) of Low-Molecular Weight Components in m-Xylylene Group-Containing Polyamide (C)

The m-xylylene group-containing polyamide (C) was dissolved in hexafluoroisopropanol to prepare a sample solution of the m-xylylene group-containing polyamide (C) with a concentration of 1.0 g/L. Next, the resulting sample solution was subjected to measurement of a number-average molecular weight thereof at a temperature of 40° C. and a flow rate of 0.3 mL/min using a GPC apparatus "HLC-8320GPC/UV-8320" (tradename) available from Tosoh Corporation to determine a content of low-molecular weight components having a number-average molecular weight of 1,000 or less in the m-xylylene group-containing polyamide (C). Meanwhile, the number-average molecular weight was determined in terms of polymethyl methacrylate (PMMA).

(5) Pseudo Gasoline Permeability ($g/m^2 \cdot day$)

The containers produced in the following Examples and Comparative Examples were respectively filled with 400 mL or 1,000 mL of pseudo gasoline (containing toluene/isooctane/ethanol at a ratio of 45/45/10 (vol %)), and then an opening of a mouth portion of each container was sealed with an aluminum foil and further plugged with a cap to measure and record a whole mass of the pseudo gasoline in the container. The pseudo gasoline was used in an amount of 400 mL in Examples 101 to 113 and Comparative Examples 101 to 107, and in an amount of 1,000 mL in Examples 201 to 214 and Comparative Examples 201 to 208.

Next, the container sealingly filled with the pseudo gasoline was stored in an explosion-proof constant temperature oven maintained at 40° C. to measure and record a whole mass of the pseudo gasoline therein every 24 hours. At the time at which a mass loss rate of the pseudo gasoline in the container was stabilized, the pseudo gasoline was withdrawn from the container, and immediately after the withdrawal, the container was sealingly filled again with pseudo gasoline. Then, the container sealingly filled with the pseudo gasoline was stored in an explosion-proof constant temperature oven maintained at 40° C. to measure and record a whole mass of the pseudo gasoline therein every 24 hours, thereby determining a pseudo gasoline permeability ($g/m^2 \cdot day$) of the container.

(6) Appearance of Container after Measurement of Pseudo Gasoline Permeability

After completing the measurement of the pseudo gasoline permeability, the pseudo gasoline was withdrawn from the container, and the appearance of the container was visually observed and compared with that of a new container immediately after being molded to determine whether or not any appearance change occurred.

(7) Tensile Strength (N) of Pinch-off Portion

The bottom of the respective containers produced in the following Examples and Comparative Examples was cut into a test piece having a width of 10 mm and a length of about 50 mm as a length measured toward both sides from a pinch-off portion thereof as a center. Next, the test piece was subjected to measurement of a tensile strength thereof at an elastic stress rate of 50 mm/min using a tensile tester.

(8) Drop Test

The containers produced in the following Examples and Comparative Examples were respectively filled with 400 mL or 1,000 mL of water and closed by a cap, and then stored at room temperature for one week. Next, the five containers with their bottom facing downward were respectively dropped from a height of 2 m onto a concrete 30 times in a continuous manner to count the number of the broken containers during the test. The water was filled in each container in an amount of 400 mL in Examples 101 to 113 and Comparative Examples 101 to 107, and in an amount of 1,000 mL in Examples 201 to 214 and Comparative Examples 201 to 208.

(9) Observation of Dispersing Condition of m-Xylylene Group-Containing Polyamide (C)

A molded tank was cut, and after a section of the thus cut tank was flattened and smoothened by a cutter, dilute iodine tincture (available from Tsukishima Yakuhin Co., Ltd.) was applied onto the section to dye a portion of the m-xylylene group-containing polyamide (C) on the section therewith. The dyed portion was observed in an enlarged scale using a stereo microscope to examine a dispersing condition of the m-xylylene group-containing polyamide (C) in the resin composition.

Production Example 1

(Production of m-Xylylene Group-Containing Polyamide (C) (PA-1))

A 50 L heating jacket-fitted SUS reaction vessel equipped with a partial condenser, a total condenser, a pressure gauge, a nitrogen inlet port, a liquid injection port, a resin withdrawal valve and a stirrer was charged with 15,000 g (102.6 mol) of adipic acid, 17.3 g (0.16 mol) of sodium hypophosphite and 12.1 g (0.15 mol) of sodium acetate, and an inside atmosphere of the reaction vessel was replaced with nitrogen. Next, while flowing nitrogen through the reaction vessel at a rate of 10 mL/min, the contents of the reaction vessel were heated to 170° C. under normal pressures. After completely melting the adipic acid, dropwise addition of 13.980 g (102.6 mol) of m-xylylenediamine into the reaction vessel was initiated. During the dropwise addition of m-xylylenediamine, while removing water produced by the polycondensation reaction from the reaction system, the contents of the reaction vessel were continuously heated so as not to solidify the reaction system. A whole amount of the m-xylylenediamine was added dropwise over 100 min, and an inside temperature of the reaction vessel was raised to 250° C. Next, the inside temperature of the reaction vessel was raised to 260° C. over 10 min while being kept under normal pressures, and then the inside pressure of the reaction vessel was reduced to 600 mmHg over 10 min using an aspirator and a pressure controller while keeping the inside temperature of the reaction vessel at 260° C., followed by continuing the polycondensation reaction under a pressure of 600 mmHg. At the time at which the viscosity of the resin material in the reaction vessel became sufficiently high while continuously monitoring a torque of the stirrer, stirring of the resin material was stopped. After increasing the inside pressure of the reaction vessel to 0.2 MPa by introducing nitrogen thereinto, the resin withdrawal valve provided at a bottom of the reaction vessel was opened to withdraw the resulting polymer in the form of strands therefrom. The thus withdrawn strands were cooled with water and then pelletized by a pelletizer, thereby obtaining about 25 kg of pellets of a m-xylylene group-containing polyamide.

Next, the pellets of the thus obtained m-xylylene group-containing polyamide (C) were charged into a jacketed tumbler dryer equipped with a nitrogen inlet pipe, a vacuum line, a vacuum pump and a thermocouple for measurement of an inside temperature thereof, and while rotating the tumbler dryer at a constant speed, an inside atmosphere of the tumbler dryer was fully replaced with a nitrogen gas having a purity of 99% by volume or more. Then, the tumbler dryer was heated under the nitrogen gas flow to raise the temperature of the pellets to 150° C. over about 150 min. At the time at which the temperature of the pellets reached 150° C., the inside pressure of the reaction system was reduced to 1 torr or less. After the tumbler dryer was further continuously heated to raise the temperature of the pellets to 200° C. over about 70 min, the pellets were held at 200° C. for 70 min. Next, a nitrogen gas having a purity of 99% by volume or more was introduced into the reaction system, and while continuously rotating the tumbler dryer, the contents of the tumbler dryer were cooled, thereby obtaining a m-xylylene group-containing polyamide (PA-1). As a result, it was confirmed that the resulting polyamide (PA-1) had a relative viscosity of 3.5, and the content of components having a number-average molecular weight of 1,000 or less in the polyamide (PA-1) as measured by GPC was 1.1%.

Production Example 2

(Production of m-Xylylene Group-Containing Polyamide (C) (PA-2))

The same procedure as in Production Example 1 was repeated except that the pellets were held at 200° C. for 30 min in the tumbler dryer, thereby obtaining a m-xylylene group-containing polyamide (PA-2). As a result, it was confirmed that the resulting polyamide (PA-2) had a relative viscosity of 2.7, and the content of components having a number-average molecular weight of 1,000 or less in the polyamide (PA-2) as measured by GPC was 1.5%.

Production Example 3

(Production of m-Xylylene Group-Containing Polyamide (C) (PA-3))

The same procedure as in Production Example 1 was repeated except that the pellets were held at 200° C. for 120 min in the tumbler dryer, thereby obtaining a m-xylylene group-containing polyamide (PA-3). As a result, it was confirmed that the resulting polyamide (PA-3) had a relative viscosity of 4.2, and the content of components having a number-average molecular weight of 1,000 or less in the polyamide (PA-3) as measured by GPC was 0.8%.

Production Example 4

(Production of m-Xylylene Group-Containing Polyamide (C) (PA-4))

The same procedure as in Production Example 1 was repeated except that the dicarboxylic acid component among the polyamide raw materials was replaced with 13,495 g (92.3 mol) of adipic acid and 1705 g (10.3 mol) of isophthalic acid, thereby obtaining a m-xylylene group-containing polyamide (PA-4). As a result, it was confirmed that the resulting polyamide (PA-4) had a relative viscosity of 3.4, and the content of components having a number-average molecular weight of 1,000 or less in the polyamide (PA-4) as measured by GPC was 1.9%.

Production Example 5

(Production of m-Xylylene Group-Containing Polyamide (C) (PA-5))

The same procedure as in Production Example 4 was repeated except that the pellets were held at 200° C. for 30 min in the tumbler dryer, thereby obtaining a m-xylylene group-containing polyamide (PA-5). As a result, it was confirmed that the resulting polyamide (PA-5) had a relative viscosity of 2.6, and the content of components having a number-average molecular weight of 1,000 or less in the polyamide (PA-5) as measured by GPC was 2.6%.

Production Example 6

(Production of m-Xylylene Group-Containing Polyamide (C) (PA-6))

The same procedure as in Production Example 1 was repeated except that after obtaining the polyamide by the melt polymerization, the holding time of the pellets in the tumbler dryer was controlled such that at the time at which the temperature of the pellets reached 150° C., the inside pressure in the reaction system was reduced to 1 ton or less, and then the pellets were held at 150° C. for 120 min in the tumbler dryer, and thereafter a nitrogen gas having a purity of 99% by volume or more was introduced into the reaction system, and while continuously rotating the tumbler dryer, the contents of the tumbler dryer were cooled, thereby obtaining a m-xylene group-containing polyamide (PA-6). As a result, it was confirmed that the resulting polyamide (PA-6) had a relative viscosity of 2.1, and the content of components having a number-average molecular weight of 1,000 or less in the polyamide (PA-6) as measured by GPC was 2.5%.

<High-Density Polyethylene (Aa) or Polyethylene (A1) Used>

HDPE-1 or A1-1:
"NOVATEC HD HB420R" (tradename) available from Japan Polyethylene Corporation; MFR: 0.2; density: 0.956

HDPE-2 or A1-5:
"NOVATEC HD HB332R" (tradename) available from Japan Polyethylene Corporation; MFR: 0.3; density: 0.952

HDPE-3 or A1-3:
"NOVATEC HD HB439R" (tradename) available from Japan Polyethylene Corporation; MFR: 0.55; density: 0.96

HDPE-4 or A1-6:
"NOVATEC HD HB424R" (tradename) available from Japan Polyethylene Corporation; MFR: 0.25; density: 0.957

HDPE-5 or A1-4:
"NOVATEC HD HB323R" (tradename) available from Japan Polyethylene Corporation; MFR: 0.15; density: 0.953

A1-2:
"NOVATEC HD HB120R" (tradename) available from Japan Polyethylene Corporation; MFR: 0.2; density: 0.938

<Polyethylene (A2) Used>

A2-1:
"NOVATEC LL UE320" (tradename) available from Japan Polyethylene Corporation; MFR: 0.6; density: 0.922

A2-2:
"NOVATEC LD ZE41K" (tradename) available from Japan Polyethylene Corporation; MFR: 0.5; density: 0.922

A2-3:
"HARMOLEX NF444N" (tradename) available from Japan Polyethylene Corporation; MFR: 2.0; density: 0.912

<Acid-Modified Polyethylene (B) Used>

AD-1:
"MODIC L502" (tradename) available from Mitsubishi Chemical Corporation; MFR: 1.0; density: 0.93

AD-2:
"MODIC HSO3" (tradename) available from Mitsubishi Chemical Corporation; MFR: 1.5; density: 0.93

AD-3:
"MODIC L504" (tradename) available from Mitsubishi Chemical Corporation; MFR: 4.1; density: 0.91

AD-4:
"ADTEX DH0200" (tradename) available from Japan Polyethylene Corporation; MFR: 0.5; density: 0.95

AD-5:
"ADMER NF518" (tradename) available from Mitsui Chemicals, Inc.; MFR: 2.4; density: 0.91

AD-6:
"ADTEX L6100M" (tradename) available from Japan Polyethylene Corporation; MFR: 1.1; density: 0.92

Example 101

Using a single-layer direct blow container molding machine equipped with a 50 mmφ single-screw extruder, an adaptor, a cylindrical die with a parison controller, a metal die, a clamping device, a cooler, etc., pellets of a mixture prepared by dry-blending HDPE-1/AD-1/PA-1 at a ratio of 80/10/10 (% by mass) were charged into a hopper of the extruder, and extruded therefrom to form a parison by setting an extruder cylinder temperature to from 210 to 235° C., an adaptor temperature to 235° C., a die temperature to 230° C. and a screw rotating speed to 30 rpm, and the resulting parison was molded by a direct blow method to obtain a tank with a threaded plug having a capacity of 450 mL and an average wall thickness of 3 mm.

The resulting tank was subjected to measurements of a pseudo gasoline permeability and a tensile strength of a pinch-off portion thereof, as well as subjected to a drop test. The results are shown in Table 1.

Examples 102 to 111

The same procedure as in Example 101 was repeated except that the kinds and amounts of the high-density polyethylene (Aa), acid-modified polyethylene (B) and m-xylene group-containing polyamide (C) compounded were changed as shown in Table 1, thereby obtaining tanks with a threaded plug.

The resulting tanks were subjected to measurements of a pseudo gasoline permeability and a tensile strength of a pinch-off portion thereof, as well as subjected to a drop test. The results are shown in Table 1.

Examples 112 and 113

The same procedure as in Example 101 was repeated except that the kinds and amounts of the high-density polyethylene (Aa), acid-modified polyethylene (B) and m-xylene group-containing polyamide (C) compounded were changed as shown in Table 1, and the extruder cylinder temperature, the adaptor temperature and the die temperature were changed to from 200 to 220° C., 220° C. and 215° C., respectively, thereby obtaining tanks with a threaded plug.

The resulting tanks were subjected to measurements of a pseudo gasoline permeability and a tensile strength of a pinch-off portion thereof, as well as subjected to a drop test. The results are shown in Table 1.

Comparative Example 101

The same procedure as in Example 101 was repeated except for using the high-density polyethylene (Aa) solely, thereby obtaining a tank with a threaded plug.

The resulting tank was subjected to measurements of a pseudo gasoline permeability and a tensile strength of a pinch-off portion thereof, as well as subjected to a drop test. The results are shown in Table 1.

Comparative Examples 102 to 107

The same procedure as in Example 101 was repeated except that the kinds and amounts of the high-density polyethylene (Aa), acid-modified polyethylene (B) and m-xylene group-containing polyamide (C) compounded were changed as shown in Table 1, thereby obtaining tanks with a threaded plug.

The resulting tanks were subjected to measurements of a pseudo gasoline permeability and a tensile strength of a pinch-off portion thereof, as well as subjected to a drop test. The results are shown in Table 1.

TABLE 1

| | High-density polyethylene (Aa) | | | | Acid-modified polyethylene (B) | | | | m-Xylylene group-containing polyamide (C) | | | | |
|---|---|---|---|---|---|---|---|---|---|---|---|---|---|
| | | | | | | | | | | | | Content of low | |
| | | MFR | | Mass ratio | | MFR | | Mass ratio | | Relative | Melting | molecular weight | Mass ratio |
| | Kind | (A) | Density | [%] | Kind | (B) | Density | [%] | Kind | viscosity | point [° C.] | component [%] | [%] |
| Example 101 | HDPE-1 | 0.2 | 0.956 | 80 | AD-1 | 1.0 | 0.93 | 10 | PA-1 | 3.5 | 238 | 1.1 | 10 |
| Example 102 | HDPE-1 | 0.2 | 0.956 | 80 | AD-2 | 1.5 | 0.93 | 10 | PA-1 | 3.5 | 238 | 1.1 | 10 |
| Example 103 | HDPE-2 | 0.3 | 0.952 | 80 | AD-1 | 1.0 | 0.93 | 10 | PA-1 | 3.5 | 238 | 1.1 | 10 |
| Example 104 | HDPE-3 | 0.55 | 0.96 | 80 | AD-3 | 4.1 | 0.91 | 10 | PA-1 | 3.5 | 238 | 1.1 | 10 |
| Example 105 | HDPE-4 | 0.25 | 0.957 | 80 | AD-5 | 2.4 | 0.91 | 10 | PA-1 | 3.5 | 238 | 1.1 | 10 |
| Example 106 | HDPE-1 | 0.2 | 0.956 | 80 | AD-1 | 1.0 | 0.93 | 10 | PA-2 | 2.7 | 238 | 1.5 | 10 |
| Example 107 | HDPE-1 | 0.2 | 0.956 | 80 | AD-2 | 1.5 | 0.93 | 10 | PA-2 | 2.7 | 238 | 1.5 | 10 |
| Example 108 | HDPE-1 | 0.2 | 0.956 | 80 | AD-1 | 1.0 | 0.93 | 10 | PA-3 | 4.2 | 238 | 0.8 | 10 |
| Example 109 | HDPE-1 | 0.2 | 0.956 | 80 | AD-2 | 1.5 | 0.93 | 10 | PA-3 | 4.2 | 238 | 0.8 | 10 |
| Example 110 | HDPE-1 | 0.2 | 0.956 | 85 | AD-1 | 1.0 | 0.93 | 10 | PA-1 | 3.5 | 238 | 1.1 | 5 |
| Example 111 | HDPE-1 | 0.2 | 0.956 | 70 | AD-1 | 1.0 | 0.93 | 15 | PA-1 | 3.5 | 238 | 1.1 | 15 |
| Example 112 | HDPE-1 | 0.2 | 0.956 | 80 | AD-1 | 1.0 | 0.93 | 10 | PA-4 | 3.4 | 222 | 1.9 | 10 |
| Example 113 | HDPE-1 | 0.2 | 0.956 | 80 | AD-1 | 1.0 | 0.93 | 10 | PA-5 | 2.6 | 222 | 2.6 | 10 |
| Comparative Example 101 | HDPE-1 | 0.2 | 0.956 | 100 | — | — | — | — | — | — | — | — | — |
| Comparative Example 102 | HDPE-3 | 0.55 | 0.96 | 80 | AD-1 | 1.0 | 0.93 | 10 | PA-1 | 3.5 | 238 | 1.1 | 10 |
| Comparative Example 103 | HDPE-5 | 0.15 | 0.953 | 80 | AD-4 | 0.5 | 0.95 | 10 | PA-1 | 3.5 | 238 | 1.1 | 10 |
| Comparative Example 104 | HDPE-1 | 0.2 | 0.956 | 80 | AD-5 | 2.4 | 0.91 | 10 | PA-1 | 3.5 | 238 | 1.1 | 10 |
| Comparative Example 105 | HDPE-1 | 0.2 | 0.956 | 85 | AD-3 | 4.1 | 0.91 | 10 | PA-6 | 2.1 | 238 | 2.5 | 5 |
| Comparative Example 106 | HDPE-1 | 0.2 | 0.956 | 80 | AD-3 | 4.1 | 0.91 | 10 | PA-6 | 2.1 | 238 | 2.5 | 10 |
| Comparative Example 107 | HDPE-1 | 0.2 | 0.956 | 70 | AD-3 | 4.1 | 0.91 | 15 | PA-6 | 2.1 | 238 | 2.5 | 15 |

| | MFR ratio (B)/(A) | Pseudo gasoline permeability [g/m$^2$ · day] | Tensile strength [N] | Occurrence of cracks upon dropping [number of breakages/total number tested] |
|---|---|---|---|---|
| Example 101 | 5.0 | 0.6 | 800 | 0/5 |
| Example 102 | 7.5 | 0.6 | 820 | 0/5 |
| Example 103 | 3.3 | 0.6 | 810 | 0/5 |
| Example 104 | 7.5 | 0.7 | 800 | 0/5 |
| Example 105 | 9.6 | 0.9 | 800 | 0/5 |
| Example 106 | 5.0 | 0.9 | 790 | 0/5 |
| Example 107 | 7.5 | 0.9 | 800 | 0/5 |
| Example 108 | 5.0 | 0.6 | 810 | 0/5 |
| Example 109 | 7.5 | 0.6 | 810 | 0/5 |
| Example 110 | 5.0 | 2.1 | 830 | 0/5 |
| Example 111 | 5.0 | 0.3 | 770 | 0/5 |
| Example 112 | 5.0 | 0.4 | 810 | 0/5 |
| Example 113 | 5.0 | 0.8 | 720 | 0/5 |
| Comparative Example 101 | — | 18.2 | 830 | 0/5 |
| Comparative Example 102 | 1.8 | 2.6 | 660 | 1/5 |
| Comparative Example 103 | 3.3 | 1.2 | 760 | 1/5 |
| Comparative Example 104 | 12.0 | 1.3 | 690 | 1/5 |
| Comparative Example 105 | 20.5 | 11.5 | 480 | 2/5 |
| Comparative Example 106 | 20.5 | 6.5 | 420 | 3/5 |
| Comparative Example 107 | 20.5 | 4.9 | 310 | 5/5 |

The polyethylene-based structures obtained in the above Examples according to the present invention all exhibited an excellent pseudo gasoline barrier property. The resulting structures respectively had a sufficient tensile strength at a pinch-off portion thereof. Also, the structures themselves were excellent in strength upon dropping, and the containers as the structures were free from occurrence of cracks upon dropping.

On the other hand, in Comparative Example 101 in which the structure was formed of only the high-density polyethylene (Aa), the resulting container was excellent in tensile strength and strength upon dropping, but deteriorated in pseudo gasoline barrier property. In Comparative Example 102 in which the MFR ratio of the acid-modified polyethylene (B) to the high-density polyethylene (Aa) was low, the resulting container was deteriorated in pseudo gasoline barrier property and tensile strength at a pinch-off portion thereof owing to a poor dispersing condition of the m-xylylene group-containing polyamide (C) therein, and suffered from occurrence of cracks upon dropping. In Comparative Example 103 in which the density of the acid-modified polyethylene (B) used therein was high, the number of the containers broken upon dropping was increased owing to the high density of the acid-modified polyethylene (B). In Comparative Example 104 in which the MFR ratio of the acid-modified polyethylene (B) to the high-density polyethylene (Aa) was high, the resulting container suffered from bleeding of the m-xylylene group-containing polyamide (C) on a surface of the container, and deteriorated in pseudo gasoline barrier property and tensile strength at a pinch-off portion thereof, and further the container suffered from occurrence of cracks upon dropping. In addition, in Comparative Examples 105 to 107 in which the m-xylylene group-containing polyamide (C) having a low relative viscosity was used, the resulting containers also suffered from bleeding of the m-xylylene group-containing polyamide (C) on a surface of the respective containers, and deteriorated in pseudo gasoline barrier property and tensile strength at a pinch-off portion thereof, and further the containers suffered from occurrence of cracks upon dropping.

Example 201

Using a single-layer direct blow container molding machine equipped with a 55 mmϕ single-screw extruder, an adaptor, a cylindrical die with a parison controller, a metal die, a clamping device, a cooler, etc., pellets of a mixture prepared by dry-blending A1-1/A2-1/AD-1/PA-1 at a ratio of 75/5/10/10 (% by mass) were charged into a hopper of the extruder, and extruded therefrom to form a parison by setting an extruder cylinder temperature to from 210 to 235° C., an adaptor temperature to 235° C., a die temperature to 230° C. and a screw rotating speed to 50 rpm, and the resulting parison was molded by a direct blow method to obtain a tank with a threaded plug having a capacity of 1,000 mL and an average wall thickness of 3.5 mm.

The resulting tank was subjected to measurements of a pseudo gasoline permeability and a tensile strength of a pinch-off portion thereof, as well as subjected to a drop test. The results are shown in Table 2.

Examples 202 to 212

The same procedure as in Example 201 was repeated except that the kinds and amounts of the polyethylene (A1), polyethylene (A2), acid-modified polyethylene (B) and m-xylylene group-containing polyamide (C) compounded were changed as shown in Table 2, thereby obtaining tanks with a threaded plug.

The resulting tanks were subjected to measurements of a pseudo gasoline permeability and a tensile strength of a pinch-off portion thereof, as well as subjected to a drop test. The results are shown in Table 2.

Examples 213 and 214

The same procedure as in Example 201 was repeated except that the kinds and amounts of the polyethylene (A1), polyethylene (A2), acid-modified polyethylene (B) and m-xylylene group-containing polyamide (C) compounded were changed as shown in Table 2, and the extruder cylinder temperature, the adaptor temperature and the die temperature were changed to from 200 to 220° C., 220° C. and 215° C., respectively, thereby obtaining tanks with a threaded plug.

The resulting tanks were subjected to measurements of a pseudo gasoline permeability and a tensile strength of a pinch-off portion thereof, as well as subjected to a drop test. The results are shown in Table 2.

Comparative Example 201

The same procedure as in Example 201 was repeated except for using A1-1 solely, thereby obtaining a tank with a threaded plug.

The resulting tank was subjected to measurements of a pseudo gasoline permeability and a tensile strength of a pinch-off portion thereof, as well as subjected to a drop test. The results are shown in Table 2.

Comparative Examples 202 to 208

The same procedure as in Example 201 was repeated except that the kinds and amounts of the polyethylene (A1), polyethylene (A2), acid-modified polyethylene (B) and m-xylylene group-containing polyamide (C) compounded were changed as shown in Table 2, thereby obtaining tanks with a threaded plug.

The resulting tanks were subjected to measurements of a pseudo gasoline permeability and a tensile strength of a pinch-off portion thereof, as well as subjected to a drop test. The results are shown in Table 2.

TABLE 2

| | Polyethylene (A) | | | | | | | | Acid-modified polyethylene (B) | | | | m-Xylylene group-containing polyamide (C) | | | |
|---|---|---|---|---|---|---|---|---|---|---|---|---|---|---|---|---|
| | Polyethylene (A1) | | | | Polyethylene (A2) | | | | | | | | | | | |
| | Kind | Density | MFR | % by mass | Kind | Density | MFR | % by mass | Kind | Density | MFR | % by mass | Kind | Relative viscosity | Melting point | % by mass |
| Example 201 | A1-1 | 0.956 | 0.2 | 75 | A2-1 | 0.922 | 0.6 | 5 | AD-1 | 0.93 | 1.0 | 10 | PA-1 | 3.5 | 238 | 10 |
| Example 202 | A1-1 | 0.956 | 0.2 | 70 | A2-1 | 0.922 | 0.6 | 10 | AD-1 | 0.93 | 1.0 | 10 | PA-1 | 3.5 | 238 | 10 |
| Example 203 | A1-1 | 0.956 | 0.2 | 65 | A2-1 | 0.922 | 0.6 | 15 | AD-1 | 0.93 | 1.0 | 10 | PA-1 | 3.5 | 238 | 10 |
| Example 204 | A1-1 | 0.956 | 0.2 | 60 | A2-1 | 0.922 | 0.6 | 20 | AD-1 | 0.93 | 1.0 | 10 | PA-1 | 3.5 | 238 | 10 |
| Example 205 | A1-2 | 0.938 | 0.2 | 80 | A2-2 | 0.922 | 0.5 | 10 | AD-6 | 0.92 | 1.1 | 5 | PA-1 | 3.5 | 238 | 5 |
| Example 206 | A1-2 | 0.938 | 0.2 | 65 | A2-2 | 0.922 | 0.5 | 10 | AD-6 | 0.92 | 1.1 | 10 | PA-1 | 3.5 | 238 | 15 |
| Example 207 | A1-2 | 0.938 | 0.2 | 50 | A2-2 | 0.922 | 0.5 | 10 | AD-6 | 0.92 | 1.1 | 20 | PA-1 | 3.5 | 238 | 20 |
| Example 208 | A1-3 | 0.96 | 0.55 | 70 | A2-2 | 0.922 | 0.5 | 10 | AD-1 | 0.93 | 1.0 | 10 | PA-1 | 3.5 | 238 | 10 |
| Example 209 | A1-3 | 0.96 | 0.55 | 70 | A2-2 | 0.922 | 0.5 | 10 | AD-5 | 0.91 | 2.4 | 10 | PA-2 | 2.7 | 238 | 10 |
| Example 210 | A1-4 | 0.953 | 0.15 | 70 | A2-2 | 0.922 | 0.5 | 10 | AD-1 | 0.93 | 1.0 | 10 | PA-3 | 4.2 | 238 | 10 |
| Example 211 | A1-5 | 0.952 | 0.3 | 70 | A2-3 | 0.912 | 2.0 | 10 | AD-6 | 0.92 | 1.1 | 10 | PA-1 | 3.5 | 238 | 10 |
| Example 212 | A1-6 | 0.957 | 0.25 | 65 | A2-1 | 0.922 | 0.6 | 10 | AD-5 | 0.91 | 2.4 | 10 | PA-1 | 3.5 | 238 | 15 |
| Example 213 | A1-1 | 0.956 | 0.2 | 70 | A2-2 | 0.922 | 0.5 | 10 | AD-1 | 0.93 | 1.0 | 10 | PA-4 | 3.4 | 222 | 10 |
| Example 214 | A1-1 | 0.956 | 0.2 | 70 | A2-2 | 0.922 | 0.5 | 10 | AD-5 | 0.91 | 2.4 | 10 | PA-4 | 3.4 | 222 | 10 |
| Comparative Example 201 | A1-1 | 0.956 | 0.2 | 100 | — | — | — | — | — | — | — | — | — | — | — | — |
| Comparative Example 202 | A1-1 | 0.956 | 0.2 | 77 | A2-1 | 0.922 | 0.6 | 3 | AD-1 | 0.93 | 1.0 | 10 | PA-1 | 3.5 | 238 | 10 |
| Comparative Example 203 | A1-1 | 0.956 | 0.2 | 55 | A2-1 | 0.922 | 0.6 | 25 | AD-1 | 0.93 | 1.0 | 10 | PA-1 | 3.5 | 238 | 10 |

TABLE 2-continued

| | | | | | | | | | | | | | | | |
|---|---|---|---|---|---|---|---|---|---|---|---|---|---|---|---|
| Comparative Example 204 | A1-1 | 0.956 | 0.2 | 80 | A2-1 | 0.922 | 0.6 | 7 | AD-1 | 0.93 | 1.0 | 3 | PA-1 | 3.5 | 238 | 10 |
| Comparative Example 205 | A1-2 | 0.938 | 0.2 | 80 | A2-2 | 0.922 | 0.5 | 7 | AD-6 | 0.92 | 1.1 | 10 | PA-1 | 3.5 | 238 | 3 |
| Comparative Example 206 | A1-4 | 0.953 | 0.15 | 35 | A2-2 | 0.922 | 0.5 | 5 | AD-4 | 0.95 | 0.5 | 20 | PA-1 | 3.5 | 238 | 40 |
| Comparative Example 207 | A1-1 | 0.956 | 0.2 | 70 | A2-2 | 0.922 | 0.5 | 10 | AD-5 | 0.91 | 2.4 | 10 | PA-6 | 2.1 | 238 | 10 |
| Comparative Example 208 | A1-3 | 0.96 | 0.55 | 70 | A1-2 | 0.938 | 0.2 | 10 | AD-1 | 0.93 | 1.0 | 10 | PA-1 | 3.5 | 238 | 10 |

| | Mass ratio to polyethylene (A) | | MFR ratio to (A1) | | Pseudo gasoline permeability [g/m$^2$·day] | Appearance of container after measurement of pseudo gasoline permeability | Tensile strength [N] | Occurrence of cracks upon dropping [number of breakages/total number tested] |
|---|---|---|---|---|---|---|---|---|
| | (A1) [% by mass] | (A2) [% by mass] | (A2) | (B) | | | | |
| Example 201 | 93.75 | 6.25 | 3.0 | 5.0 | 0.8 | Not changed | 880 | 0/5 |
| Example 202 | 87.5 | 12.5 | 3.0 | 5.0 | 0.7 | Not changed | 880 | 0/5 |
| Example 203 | 81.25 | 18.75 | 3.0 | 5.0 | 0.7 | Not changed | 860 | 0/5 |
| Example 204 | 75.0 | 25.0 | 3.0 | 5.0 | 0.8 | Not changed | 820 | 0/5 |
| Example 205 | 88.9 | 11.1 | 2.5 | 5.5 | 1.7 | Not changed | 910 | 0/5 |
| Example 206 | 86.7 | 13.3 | 2.5 | 5.5 | 0.5 | Not changed | 860 | 0/5 |
| Example 207 | 83.3 | 16.7 | 2.5 | 5.5 | 0.3 | Not changed | 810 | 0/5 |
| Example 208 | 87.5 | 12.5 | 0.9 | 1.8 | 1.2 | Not changed | 860 | 0/5 |
| Example 209 | 87.5 | 12.5 | 0.9 | 4.4 | 1.0 | Not changed | 850 | 0/5 |
| Example 210 | 87.5 | 12.5 | 3.3 | 6.7 | 0.8 | Not changed | 880 | 0/5 |
| Example 211 | 87.5 | 12.5 | 6.7 | 3.7 | 0.7 | Not changed | 900 | 0/5 |
| Example 212 | 86.7 | 13.3 | 2.4 | 9.6 | 0.8 | Not changed | 890 | 0/5 |
| Example 213 | 87.5 | 12.5 | 2.5 | 5.0 | 0.6 | Not changed | 880 | 0/5 |
| Example 214 | 87.5 | 12.5 | 2.5 | 12.0 | 0.9 | Not changed | 810 | 0/5 |
| Comparative Example 201 | — | — | — | — | 17.6 | Not changed | 940 | 0/5 |
| Comparative Example 202 | 96.25 | 3.75 | 3.0 | 5.0 | 0.8 | Not changed | 870 | 1/5 |
| Comparative Example 203 | 68.75 | 31.25 | 3.0 | 5.0 | 1.6 | Swelled | 680 | 0/5 |
| Comparative Example 204 | 92.0 | 8.0 | 3.0 | 5.0 | 3.5 | Not changed | 530 | 5/5 |
| Comparative Example 205 | 92.0 | 8.0 | 2.5 | 5.5 | 9.2 | Not changed | 920 | 0/5 |
| Comparative Example 206 | 87.5 | 12.5 | 3.3 | 3.3 | 0.11 | Not changed | 480 | 5/5 |
| Comparative Example 207 | 87.5 | 12.5 | 2.5 | 12.0 | 6.7 | Not changed | 610 | 3/5 |
| Comparative Example 208 | 87.5 | 12.5 | 0.4 | 1.8 | 1.3 | Not changed | 860 | 1/5 |

The polyethylene-based structures obtained in the above Examples according to the present invention all exhibited an excellent pseudo gasoline barrier property, and were free from deformation of a container shape thereof. The resulting structures respectively had a sufficient tensile strength at a pinch-off portion thereof. Also, the structures themselves were excellent in strength upon dropping, and the containers as the structures were free from occurrence of cracks upon dropping.

On the other hand, in Comparative Example 201 in which the structure was formed of only the high-density polyethylene, the resulting container was excellent in tensile strength and strength upon dropping, but deteriorated in pseudo gasoline barrier property. In Comparative Example 202 in which the amount of the polyethylene (A2) compounded was small, the resulting container suffered from occurrence of cracks upon dropping. In Comparative Example 203 in which the amount of the polyethylene (A2) compounded was large, the resulting container had a low strength at a pinch-off portion thereof, and was swelled and suffered from deformation during the measurement of a pseudo fuel permeability thereof. In Comparative Example 204 in which the amount of the acid-modified polyethylene (B) compounded was small, the effect of improving a barrier property of the structure was low owing to a poor dispersibility of the m-xylylene group-containing polyamide (C) therein so that the resulting container was deteriorated in pseudo gasoline barrier property, and further the container had a low strength at a pinch-off portion thereof owing to a poor interlaminar bonding strength between the polyethylene (A1) and the m-xylylene group-containing polyamide (C) and suffered from occurrence of cracks upon dropping. In Comparative Example 205 in which the amount of the m-xylylene group-containing polyamide (C) compounded was small, the effect of improving a barrier property of the structure was low so that the resulting container was deteriorated in pseudo gasoline barrier property. In Comparative Example 206 in which the amount of the m-xylylene group-containing polyamide (C) compounded was large, the strength of a pinch-off portion of the resulting container was considerably low so that the container suffered from occurrence of cracks when subjected to a drop test. In Comparative Example 207 in which the m-xylylene group-containing polyamide (C) having a low relative viscosity was used, the resulting container suffered from bleeding of the m-xylylene group-containing polyamide (C) on a surface thereof, and deteriorated in pseudo gasoline barrier property and tensile strength at a pinch-off portion thereof, and further the container suffered from occurrence of cracks upon dropping. In addition, in Comparative Example 208 in which the polyamide (A2) having a high density was used, the resulting container suffered from occurrence of cracks when subjected to a drop test owing to an excessively high rigidity of the container.

Figure 2:
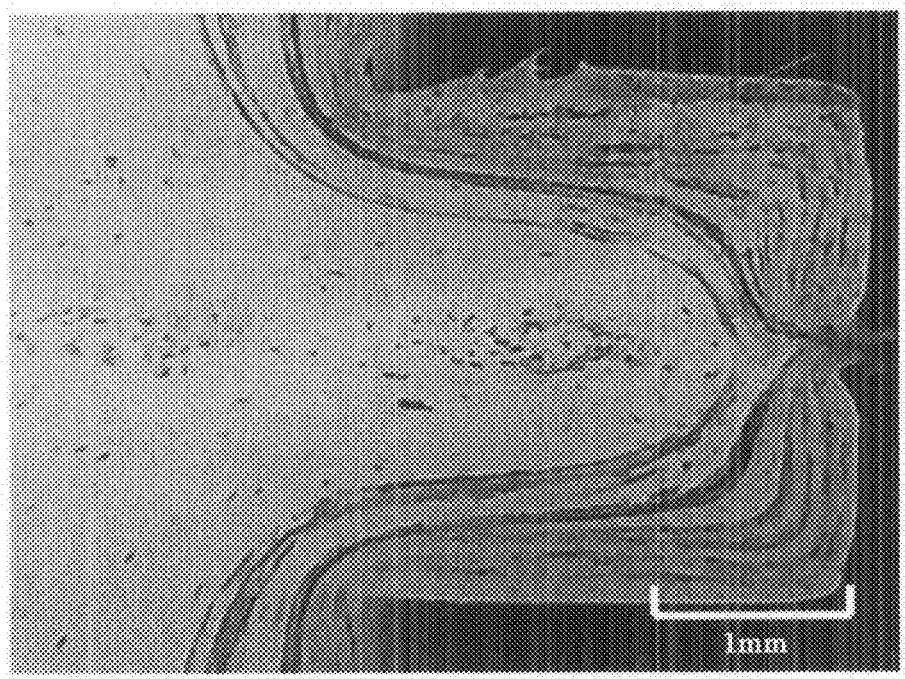
FIG. 2 is a micrograph showing a section of a pinch-off portion of the tank produced in Example 101.
Figure 3:
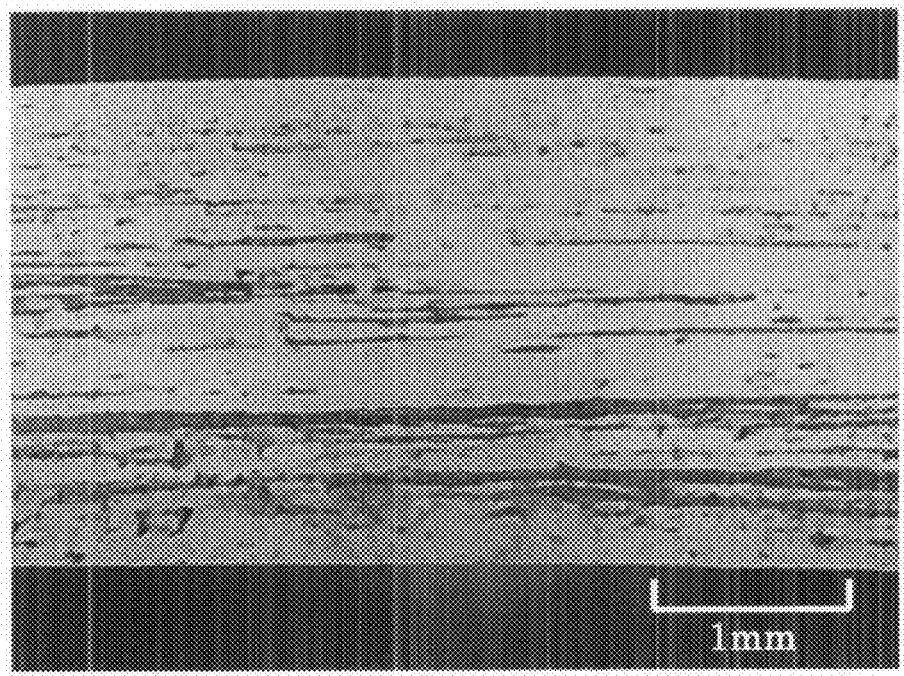
FIG. 3 is a micrograph showing a section of a side wall of a tank produced in Example 204.
Figure 4:
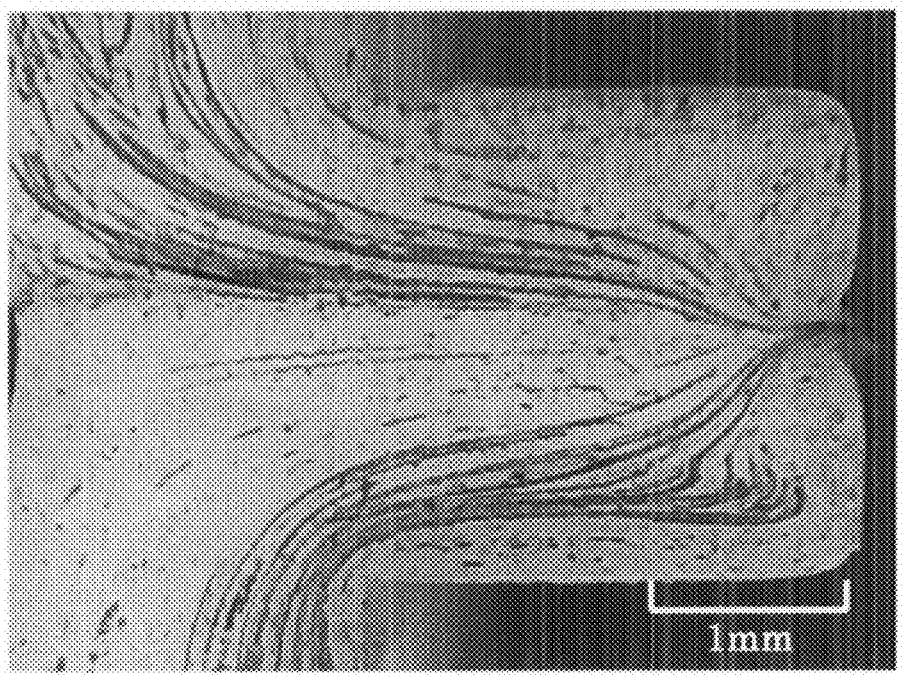
FIG. 4 is a micrograph showing a section of a pinch-off portion of the tank produced in Example 204.

The micrographs of sections of side walls of tanks obtained in Examples 101 and 204 as typical Examples of the respective embodiments of the present invention are shown in FIGS. 1 and 3, respectively (magnification: 25 times). Also, the micrographs of sections of pinch-off portions of tanks obtained in Examples 101 and 204 are shown in FIGS. 2 and 4, respectively (magnification: 25 times). In FIGS. 1 and 3, the lower side of the respective drawings indicates an outer surface side of the tank, whereas the upper side of the respective drawings indicates an inner surface side of the tank. In addition, in FIGS. 1 to 4, the white portion indicates the polyethylene, whereas the black portion indicates the m-xylylene group-containing polyamide dyed with iodine.

From FIGS. 1 to 4, it was recognized that in the tanks obtained in Examples 101 and 204, the m-xylylene group-containing polyamide was dispersed in a layer form in the polyethylene to form a continuous phase thereof. In particular, it was recognized that the m-xylylene group-containing polyamide was present in a larger amount on an outer surface side of the section of the tank relative to a center thereof, whereas the polyethylene was present in a larger amount on an inner surface side of the section of the tank relative to a center thereof. Thus, since the m-xylylene group-containing polyamide was dispersed in a layer form to form a continuous phase thereof, the tanks obtained Examples 101 and 204 had an excellent barrier property.

Also, from FIGS. 2 and 4, it was recognized that in the pinch-off portion of the parison which was formed by bonding adjacent inner surface portions of the parison to each other, since an inner surface side portion of the parison was substantially formed of polyethylene, the adjacent inner surface side portions of the parison were well bonded together. For this reason, the pinch-off portion was free from breakage and had a high strength. On the other hand, in the pinch-off portion, the m-xylylene group-containing polyamide was similarly dispersed in a layer form. Therefore, the pinch-off portion exhibited a good barrier property.

Accordingly, the tank of the present invention has not only a good barrier property but also an excellent strength.

INDUSTRIAL APPLICABILITY

The polyethylene-based structure according to the present invention is excellent in barrier property against fuels or chemicals or barrier property against various gases such as oxygen, and further can exhibit a practical strength. The polyethylene-based structure according to the present invention can be suitably used in the applications such as fuel tanks for working machines such as mowers and chainsaws, motor cycles, outboard motors and automobiles, pipes for transportation of gasoline, pipe-shaped parts mounted to fuel tanks, bottles for agricultural chemicals or detergents for toiletry or sanitary purposes, and containers for food and beverages.

The invention claimed is:

1. A polyethylene-based structure, comprising:
   (A) from 60 to 90% by mass of a polyethylene (A);
   (B) from 5 to 35% by mass of an acid-modified polyethylene (B); and
   (C) from 5 to 35% by mass of a m-xylylene group-containing polyamide (C),
   wherein:
   the m-xylylene group-containing polyamide (C) is dispersed in a layer form in the polyethylene (A),
   the m-xylylene group-containing polyamide (C) has a relative viscosity of from 2.5 to 4.5; and
   the polyethylene-based structure satisfies the following Requirement 1 or 2:
   (Requirement 1):
      (1-1): the polyethylene (A) is a high-density polyethylene (Aa) having a density of from 0.94 to 0.97 and a melt flow rate (MFR) of from 0.1 to 0.6, and
      (1-2): the acid-modified polyethylene (B) has a density of from 0.90 to 0.935 and a melt flow rate (MFR) that is in the range of from 3 to 10 times the MFR of the high-density polyethylene (Aa); or
   (Requirement 2):
      the polyethylene (A) is in the form of a mixture of a polyethylene (A1) having a density of from 0.935 to 0.965 and a polyethylene (A2) having a density of from 0.91 to 0.93, and a mass ratio of the polyethylene (A1) to the polyethylene (A2) ((A1)/(A2)) is from 70/30 to 95/5.

2. The polyethylene-based structure according to claim 1, wherein the polyethylene-based structure satisfies the Requirement 1.

3. The polyethylene-based structure according to claim 2, wherein the m-xylylene group-containing polyamide (C) comprises components having a number-average molecular weight of 1,000 or less in an amount of 2% by mass or less.

4. The polyethylene-based structure according to claim 1, comprising:
   from 60 to 90% by mass of the polyethylene (A);
   from 5 to 25% by mass of the acid-modified polyethylene (B); and
   from 5 to 35% by mass of the m-xylylene group-containing polyamide (C),
   wherein the polyethylene-based structure satisfies the Requirement 2.

5. The polyethylene-based structure according to claim 4, wherein the acid-modified polyethylene (B) has a density of from 0.90 to 0.935.

6. The polyethylene-based structure according to claim 4, wherein the polyethylene (A1) has a melt flow rate (MFR) of from 0.05 to 0.6.

7. The polyethylene-based structure according to claim 4, wherein the polyethylene (A2) has a melt flow rate (MFR) that is in the range of from 0.5 to 8 times the MFR of the polyethylene (A1).

8. The polyethylene-based structure according to claim 4, wherein the acid-modified polyethylene (B) has a melt flow rate (MFR) that is in the range of from 3 to 10 times the MFR of the polyethylene (A1).

9. The polyethylene-based structure according to claim 1, wherein the m-xylylene group-containing polyamide (C) comprises a m-xylylenediamine unit in an amount of 70 mol % or more.

10. The polyethylene-based structure according to claim 1, wherein the polyethylene-based structure is in the form of a tank, a pipe or a bottle.

11. The polyethylene-based structure according to claim 1, wherein the polyethylene-based structure is formed by a direct blow method.

12. The polyethylene-based structure according to claim 5, wherein the polyethylene (A1) has a melt flow rate (MFR) of from 0.05 to 0.6.

13. The polyethylene-based structure according to claim 5, wherein the polyethylene (A2) has a melt flow rate (MFR) that is in the range of from 0.5 to 8 times the MFR of the polyethylene (A1).

14. The polyethylene-based structure according to claim 6, wherein the polyethylene (A2) has a melt flow rate (MFR) that is in the range of from 0.5 to 8 times the MFR of the polyethylene (A1).

15. The polyethylene-based structure according to claim 5, wherein the acid-modified polyethylene (B) has a melt flow rate (MFR) that is in the range of from 3 to 10 times the MFR of the polyethylene (A1).

16. The polyethylene-based structure according to claim 6, wherein the acid-modified polyethylene (B) has a melt flow rate (MFR) that is in the range of from 3 to 10 times the MFR of the polyethylene (A1).

17. The polyethylene-based structure according to claim 1, wherein some layers of the m-xylylene group-containing polyamide (C) converge with each other in the polyethylene (A).

18. The polyethylene-based structure according to claim 1, wherein the polyethylene-based structure satisfies the Requirement 2.

* * * * *